United States Patent [19]

Namiki et al.

[11] Patent Number: 4,909,105
[45] Date of Patent: Mar. 20, 1990

[54] AUTOMATED NUT DRIVING APPARATUS

[75] Inventors: Kou Namiki; Takaji Mukumoto; Keiichiro Gunji, all of Saitama, Japan

[73] Assignee: Honda Giken Kogyo Kabushiki Kaisha, Tokyo, Japan

[21] Appl. No.: 295,362

[22] Filed: Jan. 10, 1989

Related U.S. Application Data

[62] Division of Ser. No. 53,263, May 22, 1987, Pat. No. 4,841,632.

[30] Foreign Application Priority Data

| Nov. 19, 1985 | [JP] | Japan | 60-260820 |
| Nov. 19, 1985 | [JP] | Japan | 60-260821 |
| Nov. 26, 1985 | [JP] | Japan | 60-265937 |
| Nov. 29, 1985 | [JP] | Japan | 60-270552 |
| Dec. 2, 1985 | [JP] | Japan | 60-270909 |

[51] Int. Cl.[4] ............................................. B25B 21/00
[52] U.S. Cl. .................................. 81/57.36; 81/57.22; 81/177.75
[58] Field of Search ................. 81/57.22, 57.32, 57.36, 81/177.7, 177.75, 177.8; 173/39, 42, 43, 44, 52

[56] References Cited

U.S. PATENT DOCUMENTS

| 2,069,882 | 2/1937 | Hall | 81/57.22 X |
| 3,757,613 | 9/1973 | Arndt et al. | 81/57.22 |
| 3,848,488 | 11/1974 | Weisenburger | 81/475 |
| 4,048,687 | 1/1977 | Kato et al. | 29/407 X |
| 4,109,387 | 8/1978 | Matsuoka et al. | 33/608 |
| 4,635,339 | 11/1987 | Koslowski et al. | 29/525.1 |

FOREIGN PATENT DOCUMENTS

| 976863 | 10/1975 | Canada | 414/428 |
| 2848155 | 5/1980 | Fed. Rep. of Germany | 29/771 |
| 54-18502 | 2/1979 | Japan | 29/787 |
| 54-97901 | 8/1979 | Japan | 414/427 |
| 787164 | 12/1980 | U.S.S.R. | 81/57.36 |
| 841954 | 6/1981 | U.S.S.R. | 81/57.36 |
| 2158786-A | 11/1985 | United Kingdom . | |

Primary Examiner—Mark Rosenbaum
Assistant Examiner—Andrew E. Rawlins
Attorney, Agent, or Firm—Irving M. Weiner; Joseph P. Carrier; Pamela S. Burt

[57] ABSTRACT

An automatic wheel attachment apparatus for attaching a wheel to a wheel attachment member of an automotive body. The automatic wheel attachment apparatus includes a reorienting device for reorienting a wheel attachment surface of the wheel attachment member, a phasing device for phasing wheel attachment bolts on the wheel attachment member, the phasing device being movable longitudinally and vertically of the automotive body to bring the wheel attachment member and the phasing device into central alignment with each other, a detecting device for detecting the amount and direction of movement of the phasing device, and a nut runner for fastening the wheel to the wheel attachment member while the center of the wheel attachment member as detected by the detecting device is being held in alignment with the center of the wheel. At least the reorienting device, the phasing device, and the detecting device are combined in a single robot. The automatic wheel attachment apparatus also includes a wheel gripping device for gripping the wheel with at least three gripping fingers under equal forces, and a wheel positioning device for positioning the wheel before it is brought into a wheel attachment position.

6 Claims, 19 Drawing Sheets

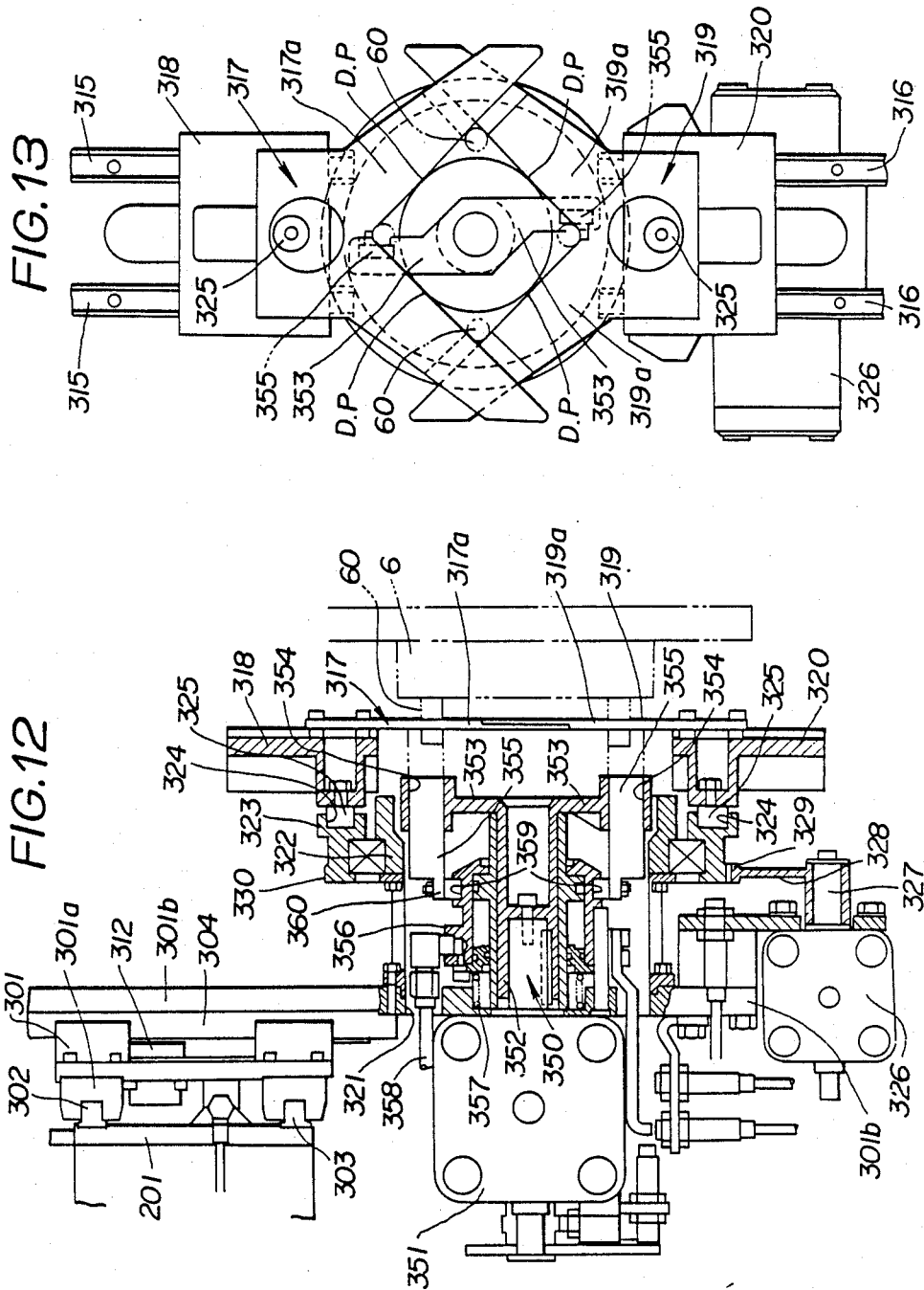

AUTOMATED NUT DRIVING APPARATUS

This is a divisional of application Ser. No. 53,263 filed May 22, 1987 now U.S. Pat. No. 4,841,632 issued Jun. 27, 1989.

BACKGROUND OF THE INVENTION

1. Field of the Invention:

The present invention relates to an automatic wheel attachment apparatus for automatically attaching wheels to an automotive body, and more particularly to a robot in such an automatic wheel attachment apparatus for reorienting a wheel attachment member or hub, phasing wheel attachment bolts on the wheel attachment member, and positionally detecting the wheel attachment member.

2. Description of the Relevant Art:

One conventional apparatus for automatically mounting wheels on an automotive body is disclosed in Japanese Laid-Open Patent Publication No. 60-42521 published March 26, 1985.

The disclosed automatic wheel attachment apparatus includes a robot mounted on an attachment base and movable transversely (X direction), longitudinally (Y direction), and vertically (Z direction) of the automotive body by respective driver mechanisms. The robot is also swingable to meet the toe-in angle ($\theta$) and the camber angle ($\gamma$) of a hub. The robot is thus singly capable of performing various phases of operation ranging from the detection of the hub position to the attachment of a wheel to the hub.

In the conventional apparatus, the wheels are installed on the automotive body with the hubs (automotive body) used as a positional reference, except when the hub bolts are phased. Therefore, the robot must be angularly moved in the X, Y, Z directions and also in directions to meet the toe-in angle ($\theta$) and the camber angle ($\gamma$). As a result, the apparatus requires a total of six control axes about which the robot should rotate, resulting in a complex mechanism and a lower degree of reliability.

SUMMARY OF THE INVENTION

According to the present invention, an automotive body transferred by a feeding device is supported by a supporting device at a wheel attachment position, in which a hub is reoriented on the basis of a robot reference, and then hub bolts are phased and the hub is positionally detected. Thereafter, a wheel is attached to the hub by a nut runner installed on or separate from a robot.

According to the present invention, there is provided an automatic wheel attachment apparatus for attaching a wheel to a wheel attachment member of an automotive body, the wheel attachment member having a wheel attachment surface with wheel attachment bolts thereon, the automatic wheel attachment apparatus comprising a reorienting device for reorienting a wheel attachment surface of the wheel attachment member, a phasing device for phasing the wheel attachment bolts, the phasing device being movable longitudinally and vertically of the automotive body to bring the wheel attachment member and the phasing device into central alignment with each other, a detecting device for detecting the amount and direction of movement of the phasing device, a nut runner for fastening the wheel to the wheel attachment member while the center of the wheel attachment member as detected by the detecting device is being held in alignment with the center of the wheel, and at least the reorienting device, the phasing device, and the detecting device being combined in a single robot.

The reorienting device, the phasing device, and the detecting device are mounted in one portion of the robot, and the nut runner is mounted in another portion of the robot, the portions of the robot being supported on a common shaft, the robot being arranged such that one of the portions confronts the wheel attachment member by rotating the shaft.

The phasing device comprises a pair of phasing fingers movable toward each other with the wheel attachment bolts therebetween, and a mechanism for releasing the wheel attachment bolts from dead points of the phasing fingers, the mechansim including a rotatable tube rotatable about the center of the phasing device, and engaging members held by the rotatable tube for engaging the wheel attachment bolts. The engaging members are rotatable with the rotatable tube and movable toward the wheel attachment member at respective speeds selected such that the engaging members traverse the dead points of the phasing fingers while the engaging members are being positioned so closely to the wheel attachment member as to engage the wheel attachment bolts.

The nut runner comprises a plurality of sockets for holding nuts to be tightened over the wheel attachment bolts, a plurality of motors for rotating the sockets respectively, a plurality of drive shafts coupled to the motors, respectively, and a plurality of universal joints connecting the sockets and the drive shafts while allowing the sockets to be tilted with respect to the drive shafts, the universal joints being movable axially of the drive shafts to allow the sockets to be retracted under reactive forces produced when the nuts engage the wheel attachment bolts.

The automatice wheel attachment apparatus also includes a wheel gripping device cooperating with the nut runner, the wheel gripping device comprising at least three cylinders independently actuatable to produce equal forces, a plurality of fingers coupled respectively to the cylinder units for pressing engagement with an outer tire of the wheel which is pre-positioned, and fixing means for keeping the fingers in pressing engagement with the tire.

The automatic wheel attachment apparatus further includes a wheel positioning device cooperating with the wheel gripping device, the wheel positioning device comprising a head vertically movably supported below the wheel which is transferred in horizontal attitude, a rotatable member rotatably disposed in the head, a centralizer disposed in a distal end of the rotatable member and fittable into a central hole of a wheel center of the wheel in response to upward movement of the head, a clamp member for engaging the wheel center while the centralizer is fitted in the central hole, and a pin mounted on the head and engageable in a bolt attachment hole in the wheel center when the bolt attachment hole reaches a prescribed position upon rotation of the wheel by the rotatable member.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 11 is a fragmentary side elevational view of thr robot as viewed in a direction opposite to the direction in which FIG. 9 is viewed;

FIG. 12 is a cross-sectional view of the hub bolt phasing device as viewed in the direction of the arrow XII in FIG. 8;

FIG. 13 is a front elevational view showing the manner in which the hub bolt phasing device operates;

DETAILED DESCRIPTION OF THE PREFERRED EMBODIMENT

Figure 1:
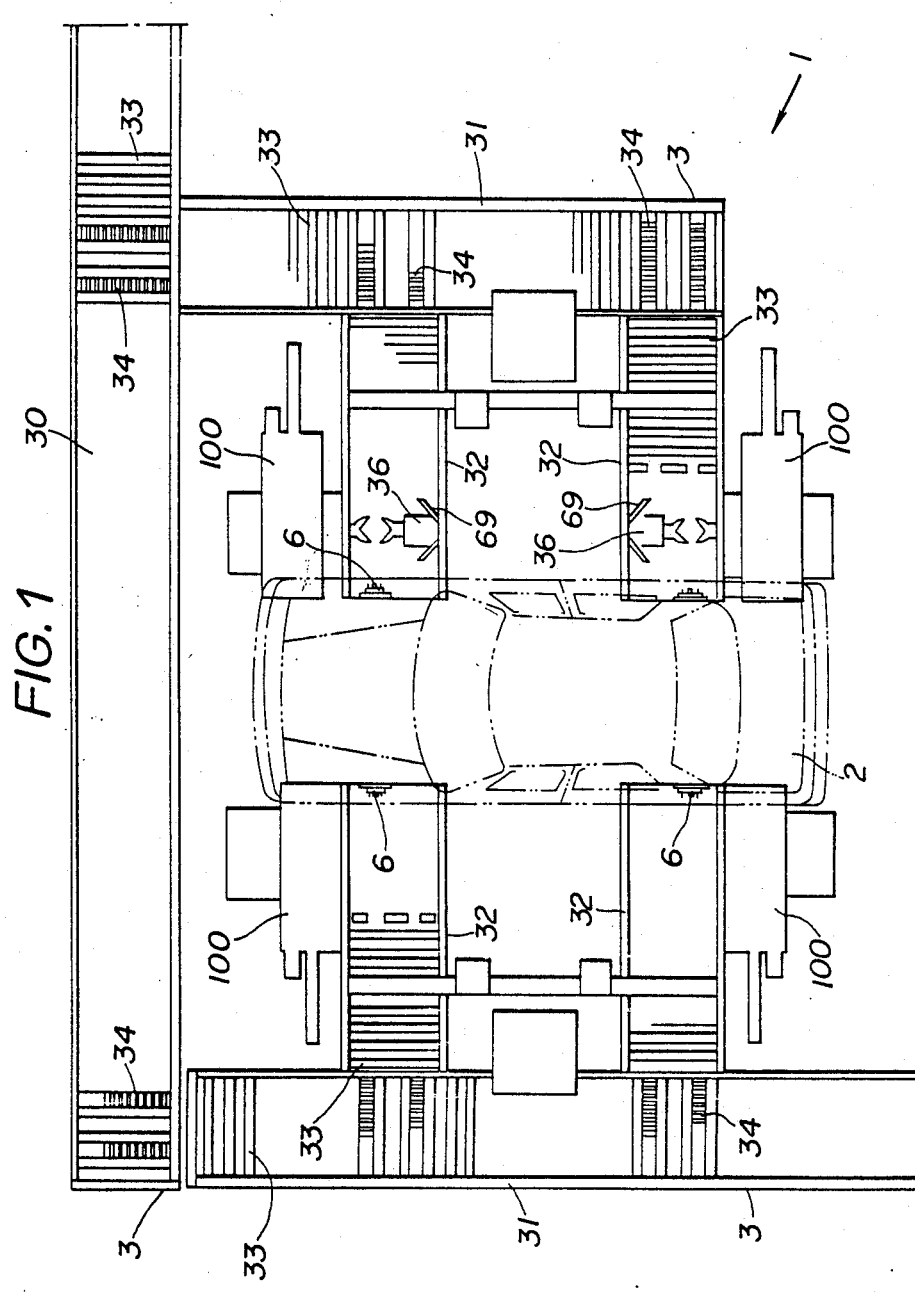
FIG. 1 is a plan view of an automatic wheel attachment apparatus incorporating robots according to the present invention.
Figure 2:
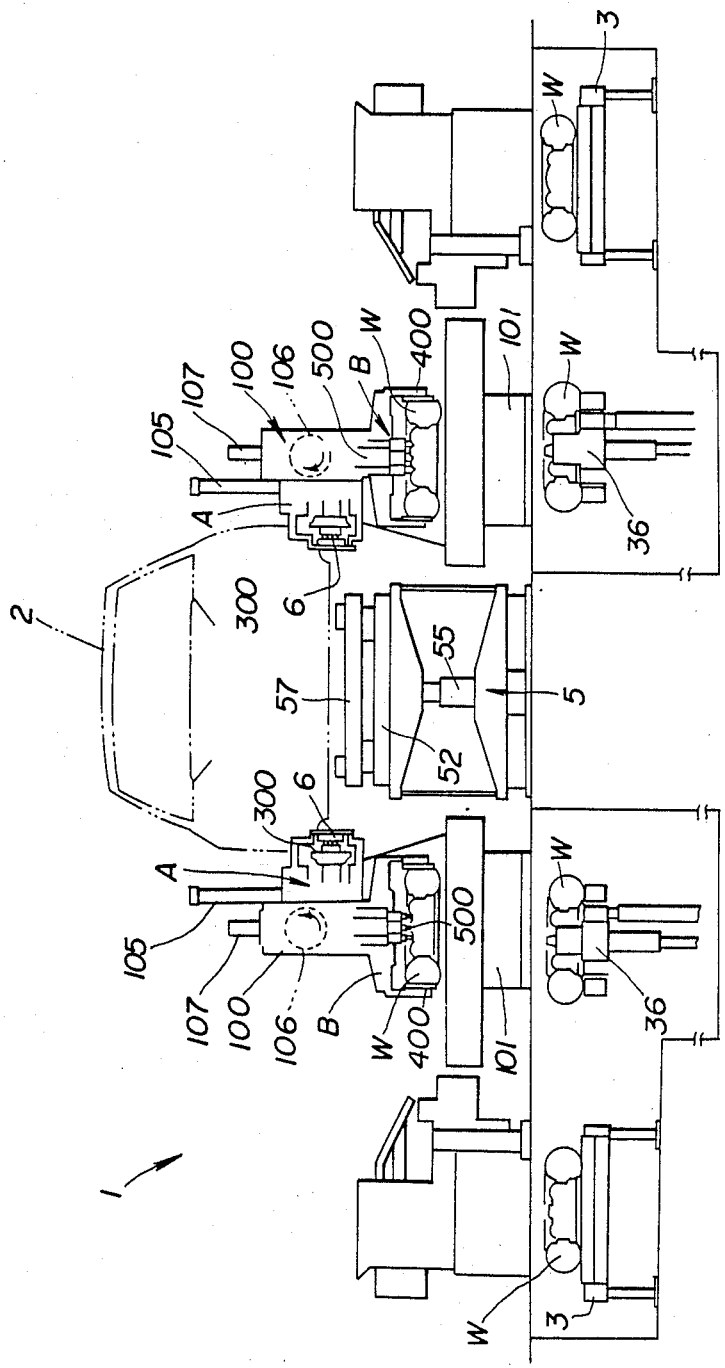
FIG. 2 is a side elevational view of the automatic wheel attachment apparatus, with an automotive body being viewed in front elevation.
Figure 3:
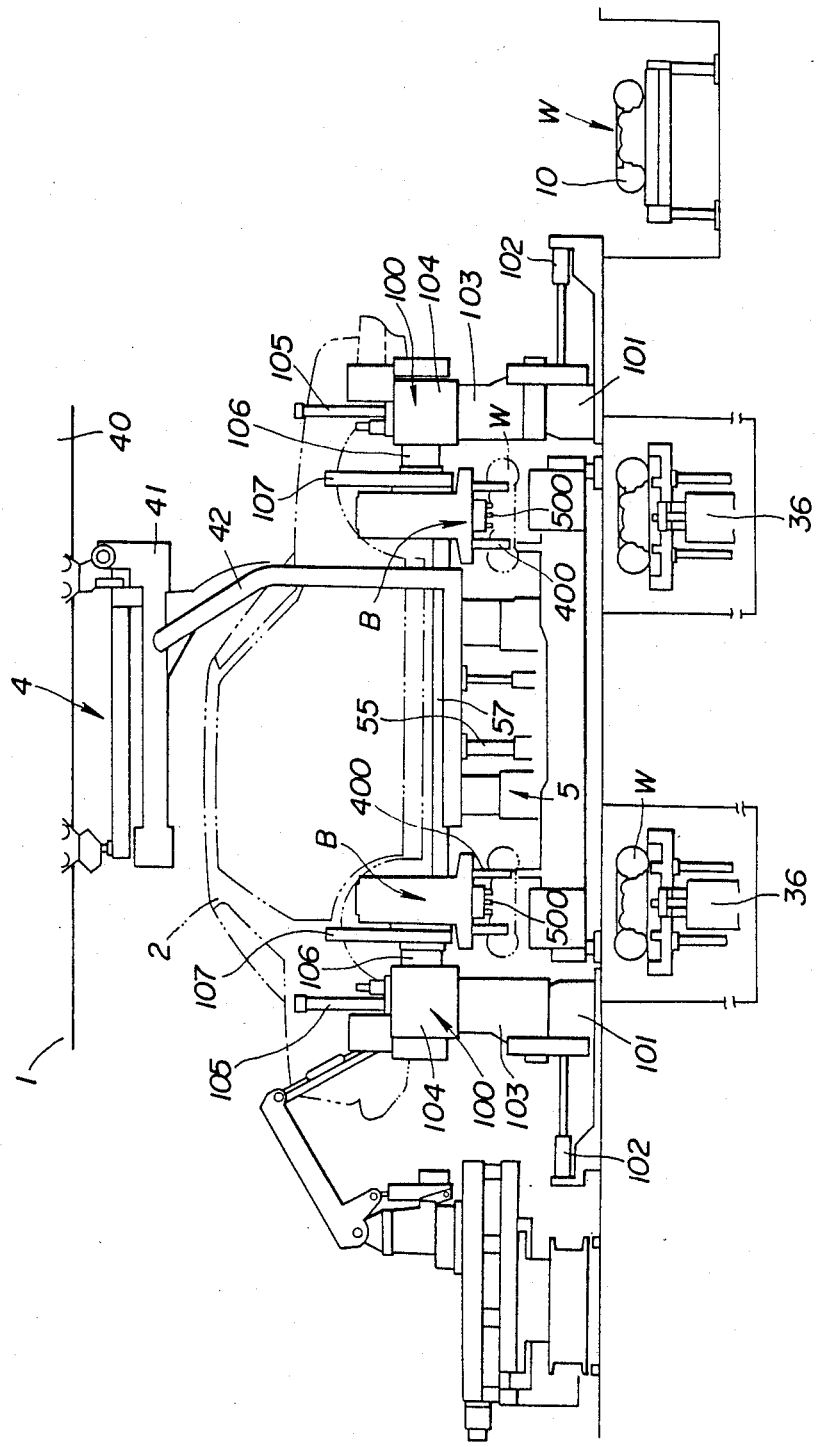
FIG. 3 is a front elevational view of the automatic wheel attachment apparatus, with the automotive body being viewed in side elevation.

As shown in FIGS. 1 through 3, an automatic wheel attachment apparatus 1 comprises a plurality of devices, i.e., a conveyor device 3 (FIGS. 1 and 2) for delivering Wheels W is horizontal attitude to an automotive body 2, wheel positioning devices 36 (FIGS. 1 through 3) each for positioning the center of a delivered wheel W and for phasing hub bolt attachment holes of the wheel W, an intermittent feeding device 4 for intermitently transferring the automotive body 2 to a wheel attachment position and for transferring the automotive body 2 with wheels W attached to a next processing station, a supporting device 5 (FIGS. 2 and 3) for floatingly supporting the automotive body 2 in the wheel attachment position, and robots 100 each for effecting various modes of operation ranging from the positioning of a wheel attachment member or hub 6 on the automotive body 2 to the attachment of a wheel W to the hub 6.

These various devices of the automatic wheel attachment apparatus 1 will be described below in detail.

The conveyor device 3 comprises a main conveyor 30, subconveyors 31 branched perpendicularly from the main conveyor 30, and subconveyors 32 branched perpendicularly from the subconveyors 31 and extending laterally to the automotive body 2. Each of the conveyors 30, 31, 32 has a number of longer rollers 33 and a number of shorter rollers 34 positioned at branched areas for changing the direction of travel of wheels W. When four wheels W, for example, are delivered on the main conveyor 30, they are separated into two's which are fed onto the subconveyors 31, from which the wheels W are transferred onto the subconveyors 32, respectively.

The wheels W transferred onto the respective subconveyors 32 are then supplied to the respective wheel positioning devices 36 which are located adjacent to the ends of the subconveyors 32. Each of the wheel positioning devices 36 positions the center of the wheel W and phases hub bolt insertion or attachment holes of the wheel W. Thereafter, the wheels W are held by the robots 100 and attached thereby to the respective hubs 6 of the automotive body 2.

Figure 4:
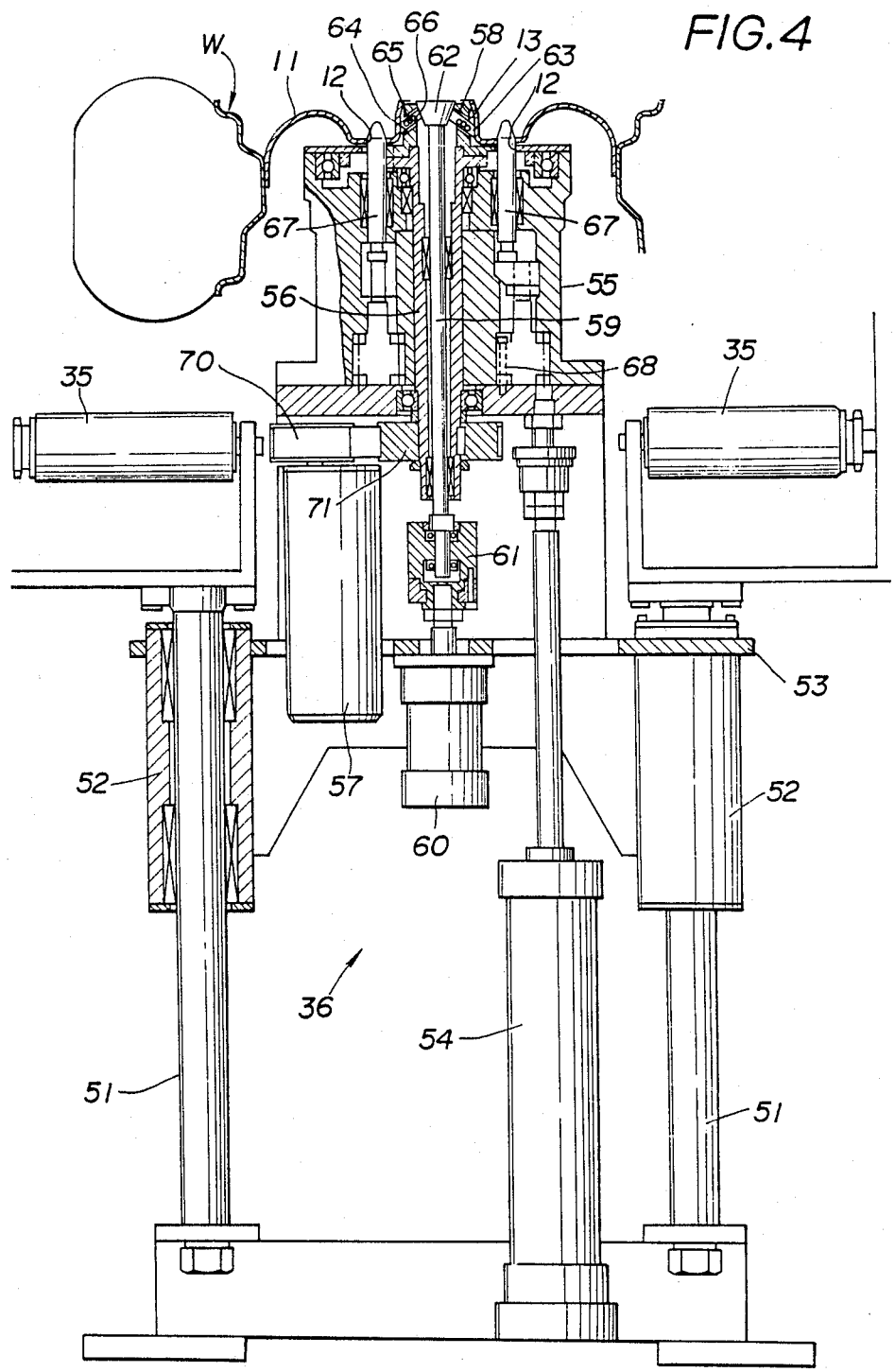
FIG. 4 is a vertical cross-sectional view of a wheel positioning device.
Figure 5:
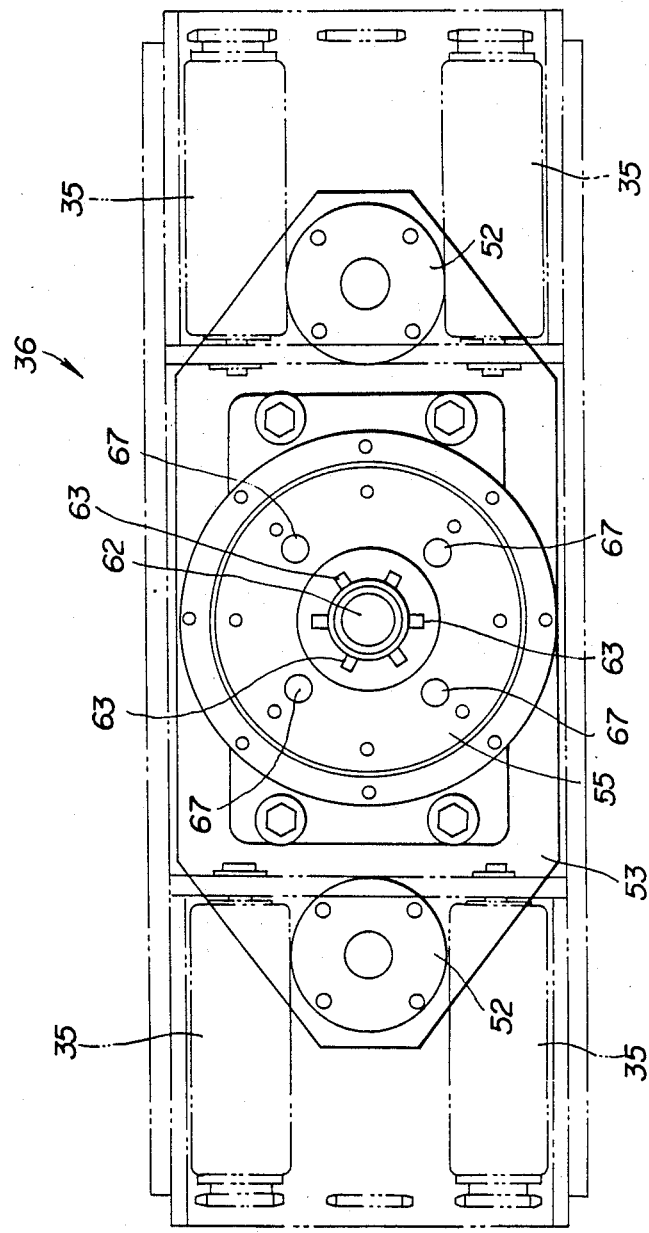
FIG. 5 is a plan view of the wheel positioning device.

The wheel positioning device 36 will be described with reference to FIGS. 4 and 5. The wheel positioning device 36 is disposed between laterally spaced rollers 35 of the subconveyor 32. The rollers 35 are supported on respective columns 51 on which a base 53 of the wheel positioning device 36 is vertically movably mounted.

The base 53 is vertically movable by a cylinder unit 54 and has an upper portion to which a head 55 is secured. A vertical hollow rotatable shaft 56 extends centrally through the head 55 and is rotatable by a motor 57 mounted on a lower portion of the head 55. The hollow shaft 56 has on its upper end a centralizer 58 projecting upwardly from the upper surface of the head 55. A rod 59 extends through the centralizer 58 and the hollow shaft 56 and is rotatably coupled through a joint 61 to a cylinder unit 60 mounted on the base 53. The rod 59 is thus vertically movable in the hollow shaft 56 by the cylinder unit 60. A plurality of radial clamp fingers 63 are movably supported on an upper head 62 disposed in the centralizer 58 of the rod 59. The clamp fingers 63 extend respectively through inclined holes 64 defined in an upper end portion of the hollow shaft 56 and project out of the shaft 56. Pins 65 are disposed in the respective inclined holes 64 and engage respectively in slots 66 defined in the respective clamp fingers 63.

When the rod 59 is lowered by the cylinder unit 60, the clamp fingers 63 project out of the inclined holes 64 into abutment against the inner surface of a central hole 13 of the wheel center 11 of the wheel W thereby to secure the wheel W to the shaft 56.

Four positioning pins 67 which are equally angularly spaced around the shaft 56 are disposed in the head 55. The positioning pins 67 are normally urged by springs 68 to move upwardly so that the upper ends of the pins 67 project upwardly beyond the upper surface of the head 55.

The wheel positioning device 36 thus constructed operates as follows:

The wheel W which has been delivered from the main conveyor 30 and the subconveyor 31 onto the subconveyor 32 is stopped and held by holder arms 69 (FIG. 1). At this time, the head 55 of the wheel positioning device 36 is positioned downwardly of the rollers 35.

Then, the cylinder unit 54 is actuated to bring the centralizer 58 on the upper end of the hollow shaft 56 into the central hole 13 of the wheel W, which is then lifted off the rollers 35 by the head 55. If the positioning pins 67 enter the hub bolt attachment holes 12 of the wheel 11 when the wheel W is lifted, the hub bolt attachment holes 12 have properly been phased. However, the hub bolt attachment holes 12 and the pins 67 are usually out of alignment, and hence the upper ends of the positioning pins 67 engage the lower surface of the wheel center 11 but do not enter the hub bolt attachment holes 12.

The cylinder unit 60 is operated to lower the rod 59. The clamp fingers 63 are pulled out and spread to cause their distal ends to engage the inner surface of the central hole 13 of the wheel center 11 for thereby fixing the wheel W to the shaft 56. Then, the motor 57 is energized to rotate the hollow shaft 56 through meshing gears 70, 71 to rotate the wheel W until the hub bolt attachment holes 12 and the positioning pins 67 are aligned with each other, whereupon the positioning pins 67 project into the respective hub bolt attachment holes 12 under the resiliency of the springs 68. Upon detecting the insertion of the positioning pins 67 into the hub bolt attachment holes 12, the motor 57 is de-energized to stop the rotation of the shaft 56. Thereafter, the wheel W will be gripped by a wheel gripping device of the robot 100, as described later.

While in the illustrated embodiment the pins 67 are forced by the springs 68 to project into the hub bolt attachment holes 12 of the wheel 11, a cylinder unit may be employed in place of the springs 68. More specifically, at the time a sensor detects when the hub bolt attachment holes 12 are positioned immediately above the positioning pins 67, the motor 57 is de-energized, and the cylinder unit is operated to insert the positioning pins 67 into the respective hub bolt attachment holes 12 to phase them.

The wheel positioning device 36 can position and phase a wheel while it is held in a horizontal attitude. Thus, the mechanism for holding the wheel is quite simple and any conventional device for inverting the wheel is not required. Since the wheel positioning device 36 can be incorporated in the wheel conveyor, it is a space saver.

As shown in FIG. 3, the intermittent feeding device 4 has a propelling body 41 movable by a motor or the like is movably mounted on a rail 40 hung from a ceiling, and a cantilevered hanger 42 supported on the propelling body 41, and the automotive body 2 is supported on the hanger 42 for intermittent feeding along the rail 40.

Figure 6:
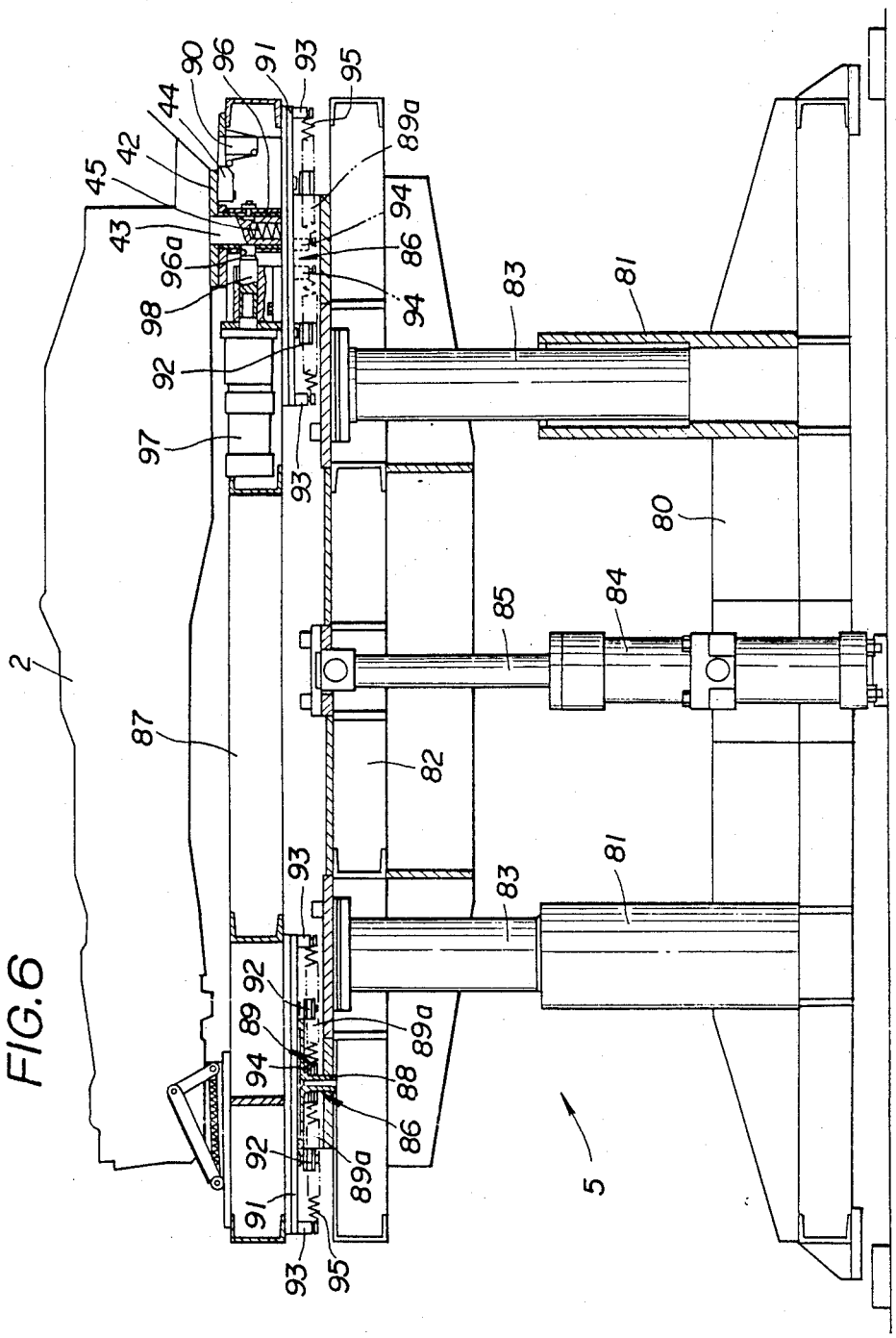
FIG. 6 is a side elevational view, partly in cross section, of an automotive body supporting device.
Figure 7:
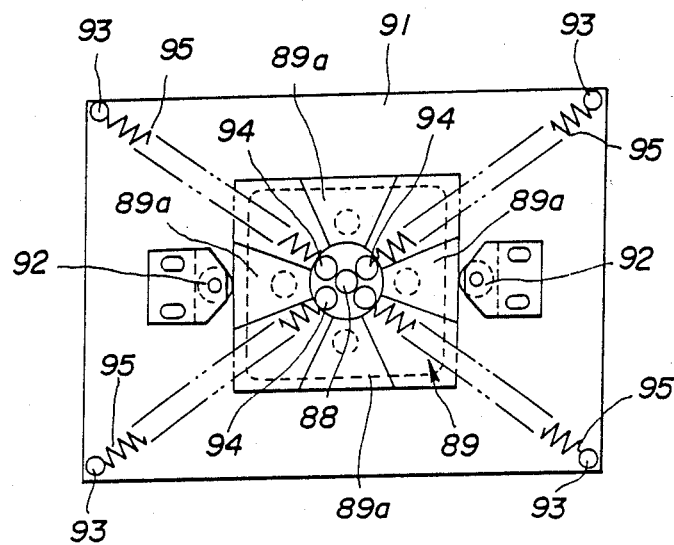
FIG. 7 is a bottom view of a floating table.

The supporting device 5 which supports, in the wheel attachment position, the automotive body 2 that has been delivered by the intermittent feeding device 4 is illustrated in detail in FIGS. 6 and 7.

The supporting device 5 has guide receivers 81 vertically mounted on a base 80 and guide rods 83 fixed to a lifter base 82 and vertically movably inserted through the guide receivers 81. A cylinder unit 84 fixed to the base 80 has a rod 85 with its upper end secured to the lifter base 82 so that the lifter base 82 can be moved upwardly and downwardly in response to operation of the cylinder unit 84.

Air bearings 86 are disposed on the respective four corners of the upper surface of the lifter base 82. A table 87 is placed on the air bearings 86. More specifically, each of the air bearings 86 comprises a pipe 88 connected to a source of compressed air and a shallow bearing seat 89 mounted on the upper end of the pipe 88, the upper surface of the bearing seat 89 being closed by a smooth flat plate 91 attached to the lower surface of the table 87.

As shown in FIG. 7, the lower surface of the bearing seat 89 has front, rear, and lateral thick portions 89a extending radially outwardly from the pipe 88. Rollers 92 mounted on the lower surface of the smooth flat plate 91 are held against the outer ends of the front and rear thick portions 89a. Coil springs 95 are coupled between pins 93 on the four corners of the lower surface of the smooth flat plate 91 and pins 94 disposed around the central pipe 88 of the air bearing 86 for normally urging the smooth flat plate 91 and the air bearing 86 to be centrally aligned when no force is applied to the smooth flat plate 91, i.e., the table 87.

A pin 43 is affixed to the hanger 42 (shown in cross section in FIG. 6) of the feeding device 4. The table 87 has a tube 96 mounted on its front portion, the pin 43 being inserted in the tube 96. The tube 96 has a hole 96a in which a rod 98 of a cylinder unit 97 fixed to the table 87 is inserted.

When the table 87 is lifted by the cylinder unit 84, the tube 96 is fitted over the pin 43 of the hanger 42. As the pin 43 is relatively inserted into the tube 96 for a prescribed interval, an actuator 44 on the hanger 42 operates a limit switch 90 attached to the table 87 for enabling the rod 98 of the cylinder unit 97 to project. The distal end of the rod 98 engages in a recess of the pin 43 to securely position the automotive body 2 on the table 87. The pin 43 houses a spring 45 therein for dampening any shocks which are produced when the lower end of the pin 43 hits the upper surface of the smooth flat plate 91.

With the automotive body 2 fixed to the table 87, the bearing seats 89 of the air bearings 86 are supplied with compressed air. Since the upper surfaces of the bearing seats 89 are closed by the respective smooth flat plates 91, the table 87 is movably supported in a horizontal plane on the air bearings 86. Inasmuch as the rollers 92 fixed to the smooth flat plates 91 are held against the front and rear thick portions 89a of the air bearings 86, however, the table 87 is floatingly supported while being permitted to move only in the transverse direction of the automotive body 2. This floating support of the automotive body 2 makes it possible to eliminate any transverse positional error of the hub 6 on one side of the automotive body 2 and also to eliminate any angular error of the hub 6 on the other side of the automotive body 2, as described later on.

Each of the robots 100 will hereinafter be described in detail.

As illustrated in FIGS. 2 and 3, the robot 100 is supported on a base 101 which is movable by a cylinder unit 102 in the longitudinal direction of the automotive body 2. A post 103 is vertically mounted on the base 101, and a box 104 housing a motor and other parts therein is mounted on the upper end of the post 103. The box 104 is vertically movable by a cylinder unit 105, the box 104 supporting a shaft 106 rotatable by the motor in the box 104. The shaft 106 supports thereon a unit A for reorienting the hub 6 and phasing the hub bolts, and a unit B for holding the wheel W and attaching the wheel W to the hub 6, the units A, B being angularly spaced 90° about the shaft 106. The unit B is vertically movable by a cylinder unit 107.

Upon rotation of each of the shafts 106 through 90° in the direction of the arrows in FIG. 2, the unit A which has completed the reorientation of the hub 6 and the phasing of the hub bolts is turned upwardly away from the hub 6, and the unit B carrying the wheel W is angularly moved up to the hub 6.

Figure 8:
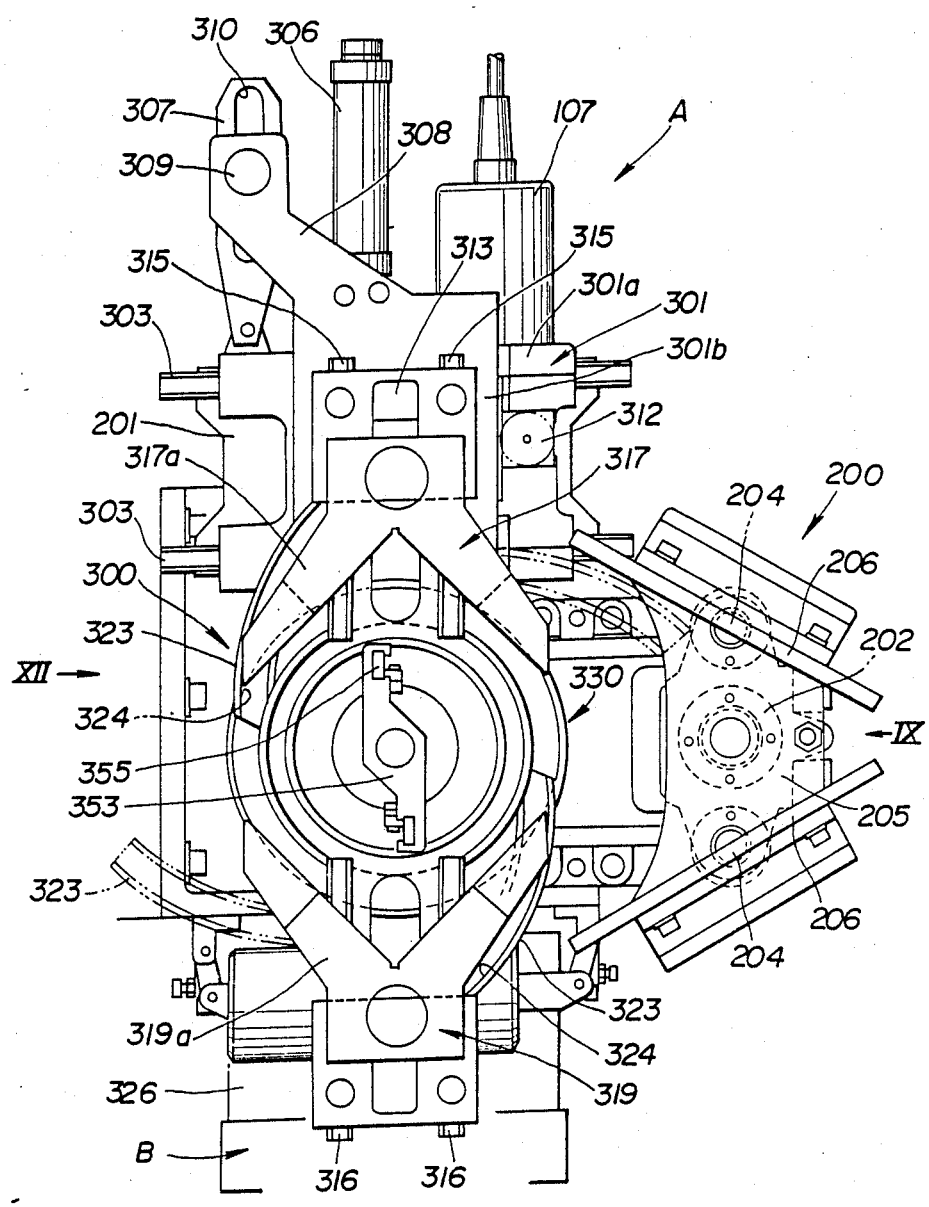
FIG. 8 is a front elevational view of a hub reorienting device and a hub bolt phasing device on a wheel attachment robot.
Figure 9:
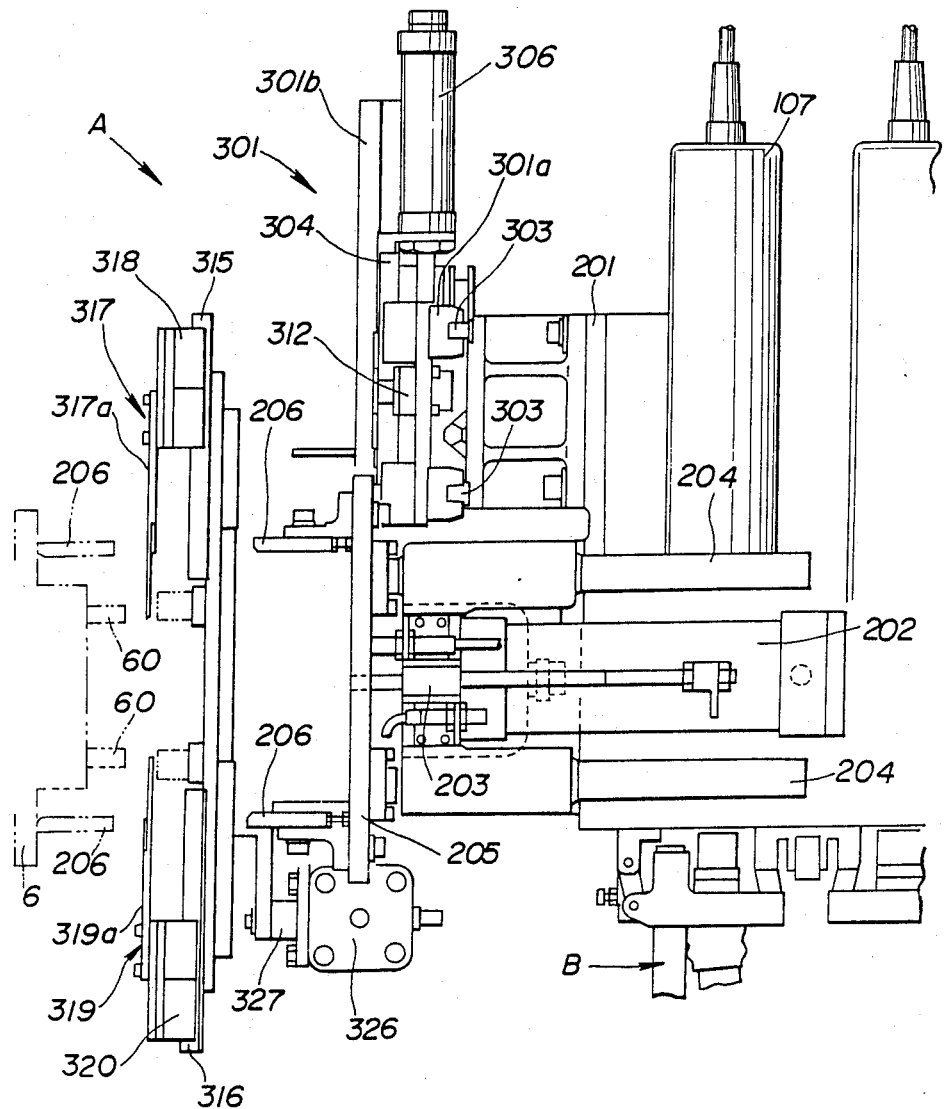
FIG. 9 is a side elevational view of the hub reorienting device and the hub bolt phasing device as viewed in the direction of the arrow IX in FIG. 8.

The unit A will first be described with reference to FIGS. 8 through 16. The unit A comprises a device 200 for reorienting the hub 6 and a device 300 for phasing the hub bolts. As shown in FIGS. 8 and 9, the reorienting device 200 includes a cylinder unit 202 mounted laterally on a support plate 201 and having a rod 203 fixed to a plate 205 slidably supported on two guide rods 204, with a pair of reorienting bars 206 attached to the plate 205. As shown in FIG. 8, the reorienting bars 206 are progressively spread away from each other, and movable toward and away from the hub 6 by the cylinder unit 202 independently of the phasing device 300.

The process of reorienting the hub 6 with the correcting device 200 will be described also with reference to FIGS. 16(A) through 16(C). The process of reorientation of the hub 6 is to control the hub 6 so that its positional error in the transverse direction of the automotive body 2 and its angular error will fall within an allowable error range, with the result that nuts can reliably be tightened on the hub bolts on the hub 6 by a nut runner, described later.

FIG. 16(A) shows in plan view the relationship between a front portion of the automotive body 2 that has been fed by the feeding device 4 and the reorienting devices 200. In the position of FIG. 16(A), the reorienting bars 206 of the lefthand and righthand reorienting devices 200L, 200R are spaced from the lefthand and righthand hubs 6L, 6R. The hubs 6L, 6R which are not yet reoriented are positionally displaced x mm from their original position in the transverse direction of the automotive body 2, and are angularly displaced y°. The hubs 6 are always subjected to a positional error and to being angularly displaced when the hub 6 is installed on a knuckle or during transfer of the automotive body 2. If one of the hubs, e.g., the righthand hub 6R, had a positional error and an angular error in a concentrated manner, then such combined errors are so large that phasing fingers 317, 319 of the phasing device 300 may not engage hub bolts 60 or nuts may not be tightened by a nut runner 500.

According to the present invention, the reorienting bars 206 of one of the reorienting devices 200R can project to a fixed extent, whereas the reorienting bars 206 of the other reorienting device 200L can project to an extent which is possible. More specifically, the reorienting bars 206 of the righthand reorienting device 200R project a fixed distance toward the hub 6R and then stops, and the reorienting bars 206 of the lefthand reorienting device 200L project until they abut against the hub 6L and are stopped thereby.

As shown in FIG. 16(B), the reorienting bars 206 of the reorienting device 200R are first caused to project a fixed amount into abutment against the righthand hub 6R. Since the automotive body 2 is floatingly supported in the transverse direction, the automotive body 2 is transversely pushed by the reorienting bars 206. Now, the positional error and angular error of the righthand hub 6R are eliminated, and any transversely positional error and angular error are all concentrated on the lefthand hub 6L.

Thereafter, as shown in FIG. 16(C), the reorienting bars 206 of the lefthand reorienting device 200L are forced to project until they abut against the lefthand hub 6L to eliminate the angular error of the the hub 6L. However, since the righthand hub 6R is engaged by the reorienting bars 206 of the righthand reorienting device 200R, any positional error of the left hand hub 6L in the transverse direction of the automotive body 2 remains.

Subsequently, the reorienting bars 206 of the righthand reorienting device 200R are retracted out of engagement with the righthand hub 6R, and then the reorienting bars 206 of the lefthand reorienting device 200L are retracted out of engagement with the lefthand hub 6L. When the reorienting bars 206 of the righthand reorienting device 200R are retracted first, the righthand hub 6R is subjected to an angular error. When the reorienting bars 206 of the lefthand reorienting device 200L are thereafter retracted, no angular error is produced on the lefthand hub 6L.

After the above reorienting process, the righthand hub 6R is subjected to an angular error only, whereas the lefthand hub 6L is subjected to a positional error only, with the result that no combined effect of these angular and positional errors is produced on each of the hubs. Therefore, phasing fingers can reliably be brought into engagement with the hub bolts in a subsequent phasing process, and nuts can reliably be tightened on the hub bolts without fail.

The reorienting bars 206 of one of the reorienting devices 200 project to a fixed interval, whereas the reorienting bars 206 of the other reorienting device 200 project until they are stopped. Thus, it is not necessary to detect how the reorienting bars 206 has projected each time the hub is reoriented, unlike the conventional apparatus in which the amount of movement of a wheel attachment robot must be detected each time the hub is reoriented. Therefore, the number of control axes is reduced and the structure is simpler according to the present invention.

Figure 11:
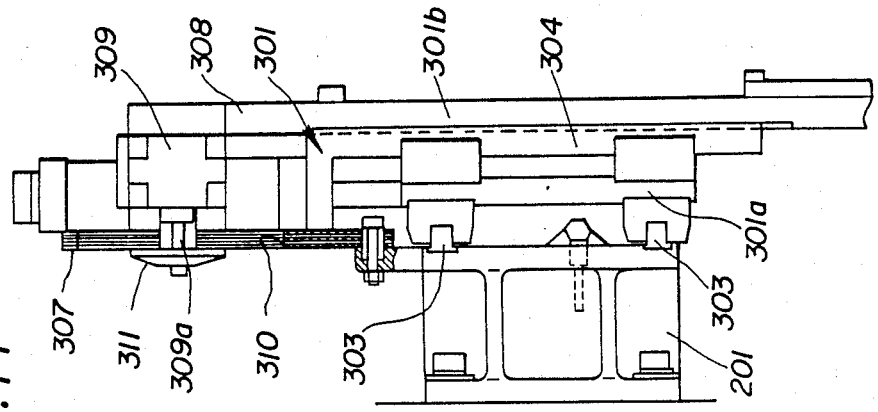

As shown in FIGS. 8 through 12, the hub bolt phasing device 300 includes a base assembly 301 mounted on the support plate 201 of the unit A and supporting a pair of phasing fingers. More specifically, the base assembly 301 comprises a first movable base 301a and a second movable base 301b. As shown in FIGS. 9 and 11, the first movable base 301a engages rails 303 attached to the support plate 201 and is movable horizontally in a plane parallel to the wheel attachment surface of the hub 6. The second movable base 301b engages the first movable base 301a through rails 304 and is movable vertically in a plane parallel to the wheel attachment surface of the hub 6. The first movable base 301a is horizontally moved with quite a small force by horizontal balancing cylinders 305 (FIG. 10), whereas the second movable base 301b is vertically moved with quite a small force by a vertical balancing cylinder 306. These small forces are smaller than a force which substantially deforms a resilient member such as a suspension, a rubber mount, or the like that is interposed between the hub 6 and the automotive body 2.

Figure 10:
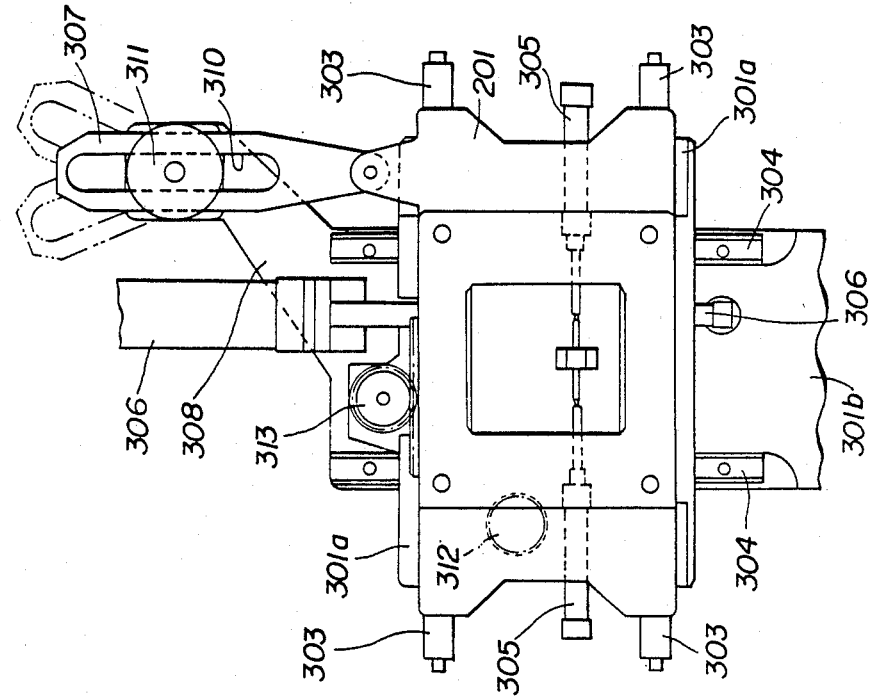
FIG. 10 is a rear elevational view of the robot.

As illustrated in FIGS. 10 and 11, clutch plates 307 have ends swingably supported on the support plates 201. A cylinder unit 309 is attached to the upper end of an arm 308 integral with the second movable base 301b. The cylinder unit 309 has a rod 309a extending through an oblong hole 310 defined in the clutch plates 307 with a presser plate 311 secured to the distal end of the rod 309a. As the movable bases 301a, 301b are moved, the clutch plates 307 are angularly moved. When the cylinder unit 309 is operated, the clutch plates 307 are sandwiched between the arm 308 and the presser plate 311 to stop the movable bases 301a, 301b. The direction and amount of movement of the movable bases 301a, 301b are detected by rotary encoders 312, 313.

As shown in FIGS. 9 and 13, two pairs of vertically extending upper and lower rails 315, 316 which are vertically spaced from each other are mounted by posts (not shown) on the second movable base 301b. An upper phasing finger 317 has its base 318 vertically movably mounted on the upper rails 315, and a lower phasing finger 319 has its base 320 vertically movably mounted on the lower rails 316. The phasing fingers 317, 319 have pairs of right-angularly spaced arms 317a, 319a, respectively, which have thin tip end portions so that when the phasing fingers 317, 319 are moved closely toward each other, the tip end portions of the arms 317a, 319a overlap each other.

The phasing fingers 317, 319 are interconnected such that they can be moved away from each other by a mechanism (described later).

Figure 14:
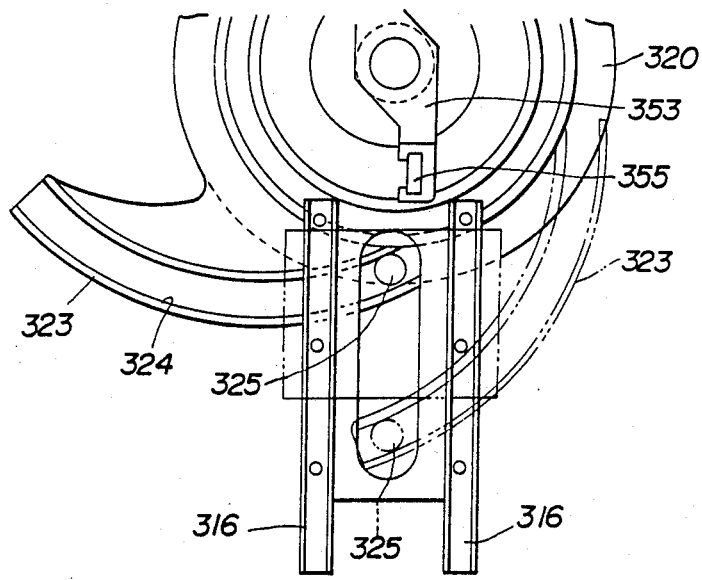
FIGS. 14 and 15 are fragmentary views of a mechanism for operating the hub bolt phasing device.
Figure 15:
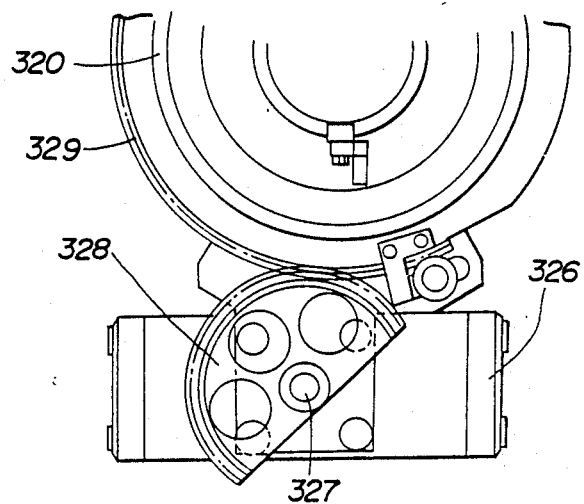
Figure 16:
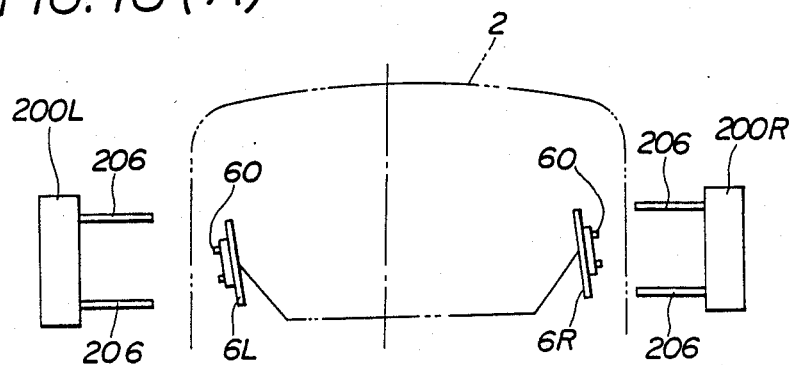
FIGS. 16(A) through 16(C) are plan views explaining the principle of angularly correcting or reorienting hubs.
Figure 16:
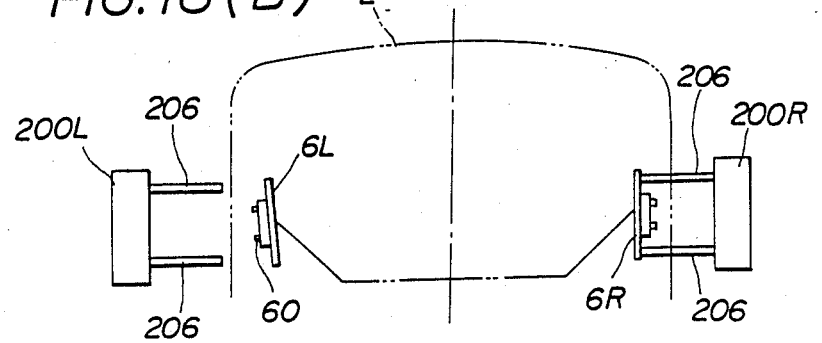
Figure 16:
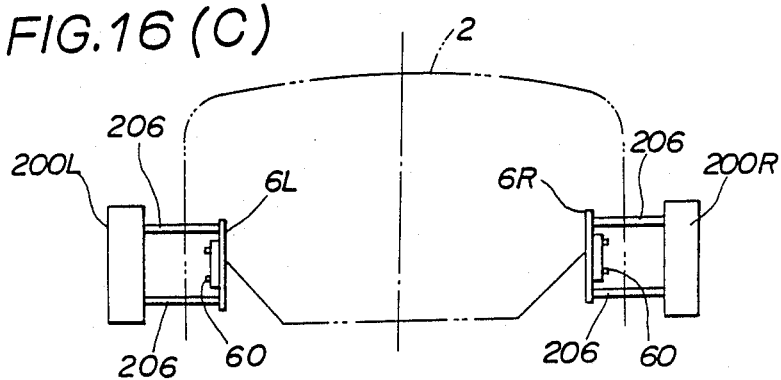

The phasing fingers 317, 319 are also in engagement with a rotatable body 330 as well as the rails 315, 316. As shown in FIG. 12, the rotatable body 330 is rotatably mounted around a tubular body 322 having one end fixedly disposed in a circular hole 321 defined in the movable base 301b. Curved arms 323 which are symmetrical in shape with respect to the center of rotation of the rotatable body 330 extend therefrom (only one curved arm is shown in FIG. 14). The curved arms 323 have grooves 324, respectively, in which rollers 325 mounted on the phasing finger bases 318, 320 are fitted. A motor 326 is mounted on a lower portion of the movable base 301b and has a rotatable shaft 327 over which a semicircular gear 328 is fitted. The gear 328 is held in mesh with gear teeth 329 on the outer peripheral edge of the rotatable body 330, as shown in FIGS. 12 and 15.

When the motor 326 is energized, the rotatable body 330 is angularly moved clockwise in FIG. 8 until the curved arms 323 reach the position indicated by the imaginary lines. During such rotation, since the rollers 325 of the phasing fingers 317, 319 engage in the grooves 324 of the curved arms 323, the upper phasing finger 317 moves downwardly along the rails 315 and the lower phasing finger 319 moves upwardly along the rails 316. As shown in FIG. 13, the tip ends of the arms 317a, 319a of the phasing fingers 317, 319 overlap each other to form a square shape. The hub bolts 60 of the hub 6 are positioned respectively at the corners of the square shape. The hub bolts 60 of the hub 6 which has been reoriented by the reoriented device 200 are now phased.

The center of the hub 6 after it has been reoriented and the center of the phasing device 300 are not necessarily aligned with each other, but may be displaced from each other in the longitudinal and vertical directions of the automotive body 2. At the same time that the hub bolts 60 are phased, positional detection is effected in order to bring the center of the phasing device 300 into alignment with the center of the hub 6. More specifically, if the hub bolts 60 are phased while the phasing device 300 and the hub 6 are out of central alignment, the hub bolts 60 do not abut against the arms 317a, 319b of the upper and lower phasing devices 317, 319 simultaneously, but one of the hub bolts 60 abuts against one of the phasing fingers 317. Then, the movable bases 301a, 301b supporting the phasing fingers 317, 319 are moved vertically and laterally with small forces by the horizontal balancing cylinders 305 and the vertical balancing cylinder 306. For example, if one of the hub bolts 60 first engages the upper phasing finger 317 when the motor 326 is energized to move the phasing fingers 317, 319 toward each other, the upper phasing fingers 317 is prevented from descending further, and the rotatable body 330 and the lower phasing finger 319 continuously ascend, with the first movable base 301a of the phasing device 300 moving upwardly. If one of the hub bolts 60 abuts against one of the arms of the phasing fingers 317, 319, the second movable base 301b is moved horizontally. Thus, where the hub 6 and the base assembly 301 of the hub bolt phasing device 300 are out of central alignment with each other, the center of the base assembly 301 is moved into alignment with the center of the hub 6 at the same time that the hub bolts are being phased. After the hub bolts have been phased, the cylinder unit 309 is operated to grip the clutch plates 307 to fix the movable bases 301a, 301b in position. Thereafter, the direction and amount of movement of the movable bases 301a, 301b are detected by the rotary encoders 312, 313, and signals from the rotary encoders 312, 313 indicating the detected direction and amount of movement are supplied to a control unit (not shown). The control unit then computes the accurate position of the hub 6 based on the supplied signals.

When the phasing fingers 317, 319 are moved toward each other to phase the hub bolts 60, the hub bolts 60 which are angularly spaced 45° may happen to engage the dead points D.P. of the phasing fingers 317, 319, and hence the hub 6 may not rotate in either direction irrespective of the fact that the hub bolts 60 are out of phase.

As shown in FIG. 12, a dead-point releasing mechanism 350 is disposed in the tubular body 322 for releasing the hub bolts 60 off the dead points of the phasing fingers 317, 319.

The dead point releasing mechanism 350 includes a rotatable tube 352 fixed to the rotatable shaft of a motor 351 and having a pair of integral arms 353 on its distal end, the arms 353 having through holes 354 on their distal ends with engaging members 355 slidably inserted through the holes 354, respectively. A nonrotatable tube 356 is disposed around the rotatable tube 352 and normally urged by a spring 357 toward the hub 6. A cylinder rod 358 extending from a cylidner unit (not shown) has its tip end engaging the tube 356 to keep the tube 356 nonrotatable even when the rotatable tube 352 is rotated. The tube 356 has a groove 359 defined in the outer periphery thereof at its distal end, and rollers 360 on the engaging members 355 are fitted in the groove 359.

The dead point releasing mechanism 350 operates as follows: When the motor 326 is energized to move the phasing fingers 317, 319 toward each other, the motor 351 is also energized to rotate the rotatable tube 352 slowly. Since the tube 356 is not rotated at this time, the rollers 360 on the engaging members 355 roll in and along the groove 359 of the tube 356.

Upon energization of the motor 351, the cylinder unit is operated to cause the cylinder rod 358 to move the tube 356 along the rotatable tube 352 toward the hub 6. The engaging members 355 are now moved toward the hub 6 while these are being rotated by combined motion of the rotatable tube 352 as it is rotated and the tube 356 as it is moved toward the hub 6, until finally the distal ends of the engaging members 355 abut against the rear surfaces of the phasing fingers 317, 319, whereupon the tubes 352, 356 are stopped.

The speed of rotation of the tube 352 and the speed of movement of the tube 356 are selected such that during the time period in which the distal ends of the engaging members 355 overlap the tip ends of the hub bolts 60 as viewed in side elevation and indicated by the imaginary lines in FIG. 12, the engaging members 355 traverse the dead points D.P. of the phasing fingers 317, 319 once. With such a speed setting, even if the hub bolts 60 are exactly 45° out of phase, they can be displaced off the dead points D.P. by sidewise engagement with the engaging members 355 and can reliably be forced into the corners of the square shape formed by the phasing fingers 317, 319 as they are brought together.

While the engaging members 355 are moving toward the hub 6 and rotating, the distal ends thereof may hit the tip ends of the hub bolts 60 in face-to-face relation and may not be able to engage the sides of the hub bolts 60. In this case, however, the tube 356 is resiliently retracted against the force of the spring 357. Such retracted movement of the tube 356 is then detected, and the engaging members 355 are moved back to their original position, after which the tube 352 is slightly rotated. Then, the above process is repeated again. Accordingly, the hub bolts 60 can reliably be released from the dead points D.P. of the phasing fingers 317, 319 for phasing purposes.

As described above, the unit A of the robot 100 is composed of the device 200 for reorienting the hub 6 and the device 300 for phasing the hub bolts 60. The hub 6 is first reoriented by the reorienting device 200, then the the hub 6 is positioned during the phasing process with the automotive body 6 used as a reference, and the accurate position of the hub 6 which has been phased is computed by the control unit. Thereafter, the wheel W is placed in confronting relation to the hub 6 and attached to the hub 6 by the unit B of the robot 100.

The unit B of the robot 100 will hereinafter be described.

As shown in FIGS. 2 and 3, the unit B comprises a wheel gripping device 400 and a nut runner 500, which is disposed back in the center of the wheel gripping device 400.

Figure 17:
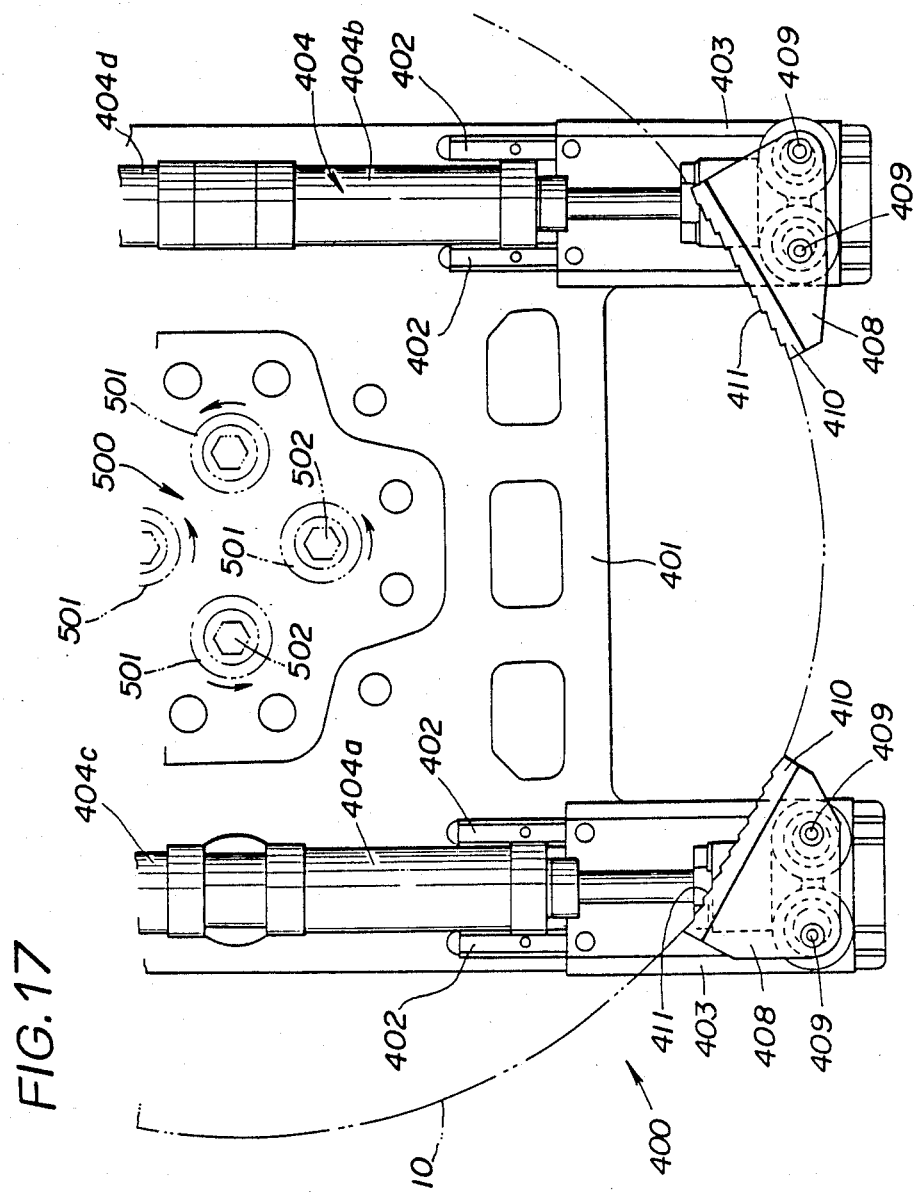
FIG. 17 is a fragmentary bottom view of a wheel gripping device.

The wheel gripping device 400 will be described with reference to FIGS. 17 through 20. The wheel gripping device 400 has a pair of rails 402 at each of the four corners of a support plate 401. A movable body 403 engages each pair of rails 402 and is fixed to a cylinder unit 404 which is actuated to move the movable body 403 along the rails 402. The rails 402 in each pair extend parallel to each other. There are four cylinder units 404 (404a–404d) secured to the support plate 401 for moving the respective movable bodies 403. In FIG. 17, only two cylinder units 404a, 404b are shown in their entirety, and the other two cylinder units 404c, 404d are partly illustrated. The cylinder units 404a, 404b and the cylinder units 404c, 404d have their axes parallel to each other, and the cylinder units 404a, 404c and the cylinder units 404b, 404d have their axes aligned with each other. The cylinder units 404a–404d produce equal operating forces.

Figure 18:
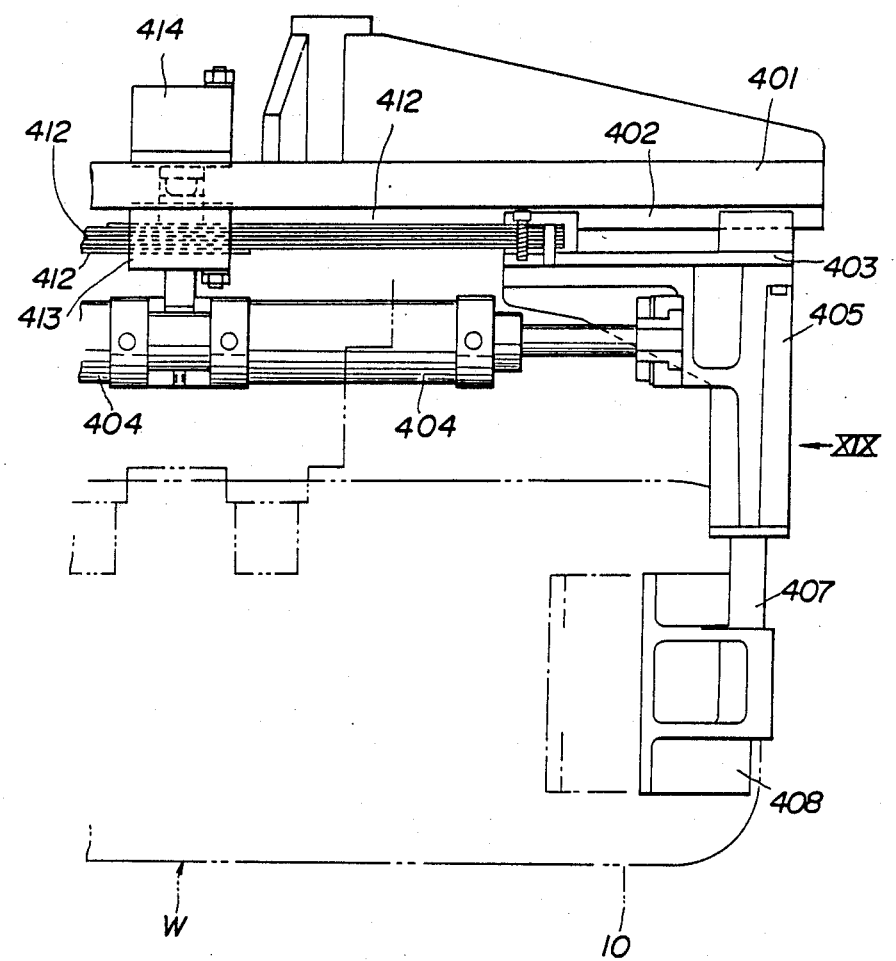
FIG. 18 is a fragmentary side elevational view of the wheel gripping device.
Figure 19:
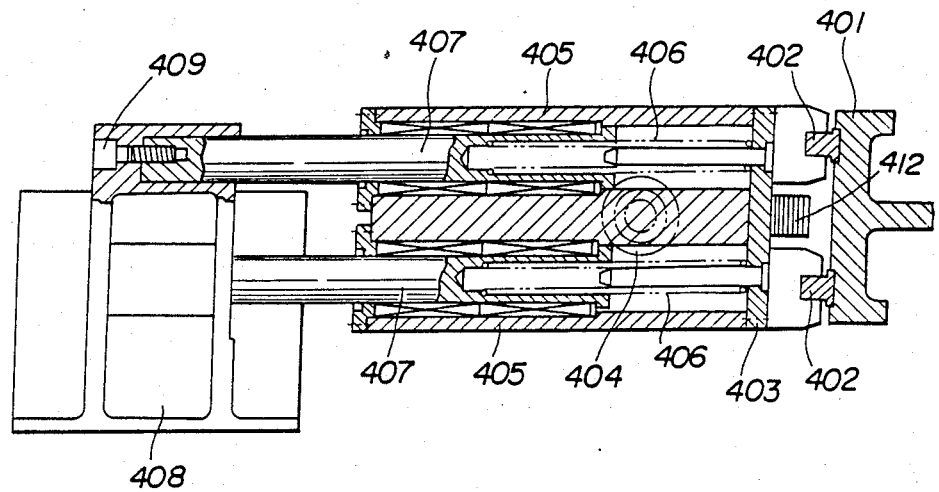
FIG. 19 is a cross-sectional view of the wheel gripping device as viewed in the direction of the arrow XIX in FIG. 18.

As illustrated in FIGS. 18 and 19, two tubes 405 are fixed to each movable body 403 and extend downwardly (FIG. 18) perpendicularly to the axis of the cylinder unit 404. As shown in FIG. 19, shafts 407 are inserted in the tubes 405, respectively, and normally urged by springs 406 in a direction to project out of the tubes 405. The shafts 407 have projecting ends to which a gripper or finger 408 is secured by bolts 409. The finger 408 is of a substantially triangular shape as viewed in plan as shown in FIG. 20, and has a presser plate 410 for pressing engagement with a tire 10 of the wheel W, the presser plate 410 having a number of teeth 411 on its outer surface.

Figure 20:
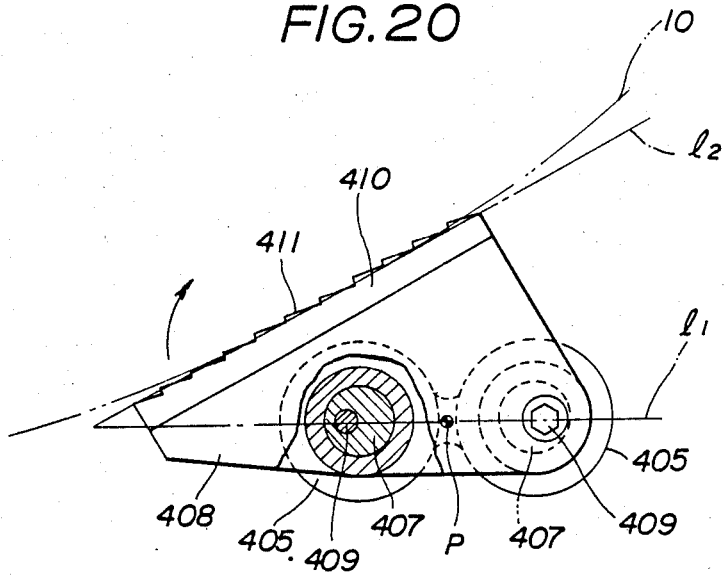
FIG. 20 is a view, partly in cross section, of a gripper of the wheel gripping device.

The bolts 409 are fastened to the shafts 407 at eccentric or off-center positions as shown in FIGS. 19 and 20. The bolts 409 are connected by a line $l_1$ which extends at an angle ranging from 30° to 60° with respect to a tangential line $l_2$ of the tire 10 where it is pressed by the presser plate 410.

As shown in FIG. 18, a stack of spaced clutch plates 412 are attached at one end to each movable body 403, and are disposed at the other end in overlapping relation to another stack of clutch plates 412 attached to another movable body 403 within a fastening device 413 mounted transversely centrally on the support plate 401. The movable bodies 403 with their clutch plaes 412 held in overlapping relation as described above are associated with the cylinder units 404 having aligned axes. More specifically, the clutch plates 412 of the movable body 403 which is moved by the cylinder unit 404a are positioned in overlapping relation to the clutch plates 412 of the movable body 403 moved by the cylinder unit 404c, whereas the clutch plates 412 of the movable body 403 which is moved by the cylinder unit 404b are positioned in overlapping relation to the clutch plates 412 of the movable body 403 moved by the cylinder unit 404d.

Each of the fastening devices 413 is operated by a cylinder unit 414. When the cylinder unit 414 is not actuated, the overlapping clutch plates 412 are slidable against each other, and the movable bodies 403 are movable along the rails 402 by the cylinder units 404. When the cylinder unit 414 is actuated to cause the fastening device 413 to press the overlapping clutch plates 412 against each other, the movable bodies 403 are thereby securely fixed. Thus, after the cylinder units 404 have been operated to cause the fingers 408 to hold the tire 10 of the wheel W, the cylinder units 414 are actuated to lock the wheel W on the wheel gripping device 400.

In operation, the cylinder unit 105 (FIGS. 2 and 3) of each robot 100 is operated to lower the unit B of the robot 100 to the wheel positioning device 36, and then the cylinder units 404a–404d are actuated to grip the tire 10 of the wheel W under equal forces at four points on the tire 10.

Since the tire 10 is gripped with equal forces at plural positions thereon, the central position of the wheel W remains unchanged. In the conventional wheel gripping deivce, only one cylinder unit is actuated, and its movement is transmitted through a link mechanism to respective gripping fingers which grip the tire of a wheel by depressing the same to equal depths. However, the tire is not uniform in thickness and has different thicknesses at localized areas. If the tire area engaged by one finger is thick and the tire area engaged by another finger is thin, then the thick tire area produces a larger repelling force whereas the thin tire area produces a smaller repelling force when they pushed to equal depths by the corresponding fingers. Inasmuch as the wheel is held by the fingers only, the center of the wheel is displaced until the repelling forces from the tire become equalized. As a result, the center of the nut runner and the center of the wheel are thrown out of alignment, and nuts cannot be tightened. The nut runner and the wheel gripping device cannot therefore be combined with each other.

According to the depicted embodiment of the present invention, however, the fingers 408 are attached respectively to the cylinder units 404a–404d so that the fingers 408 are pulled under equal forces. Consequently, the tire 10 of the wheel W can be gripped such that, even if the tire 10 has areas of different thicknesses, the thick tire area is depressed to a lesser degree and the thin tire area is depressed to a larger degree. The center of the wheel W which has once been positioned is thus never displaced. The wheel gripping 400 and the nut runner 500 may be combined together in the unit B of the robot 100 for allowing nuts to be reliably tightened on the hub bolts.

After the wheel W has been gripped by the wheel gripping device 400 while the wheel center is being kept in positional alignment, the unit 105 is actuated again to lift the unit B to face the hub 6 while the hub 6 and the wheel W are being kept in central alignment with each other. Then, the cylinder unit 107 is operated to move the wheel gripping device 400 toward the hub 6 until the hub bolts 60 are inserted into the hub bolt insertion holes of the wheel W held by the wheel gripping device 400. Nuts 502 held in respective sockets 501 of the nut runner 500 (see FIG. 17) are tightened on the hub bolts 60 by rotating the sockets 501 to complete the attachment of the wheel W to the hub 6.

As shown in FIG. 17, the nuts 502 are tightened by rotating the sockets 501 counterclockwise, for example. When all of the sockets 501 are being rotated counterclockwise, the nut runner 500 is subjected to a force tending to rotate the nut runner 500 counterclockwise as a whole. The wheel W is then turned bodily by such a force, exerting an undue force to the hub 6.

To eliminate the above problem, the finger 408 is shaped and the finger 408 is attached to the shafts 407 as follows: The line $l_1$ interconnecting the bolts 409 and the line $l_2$ tangential to the tire 10 where it is pressed by the presser plate 410 form the prescribed angle, as described above. When the wheel W tends to rotate counterclockwise upon counterclockwise rotation of the sockets 501 in FIG. 17, the finger 408 is turned in the direction of the arrow (FIG. 20) about an intermediate point P between the bolts 409 at the time the wheel W is slightly turned. The teeth 411 of the presser plate 410 bite into (or more firmly engage) the tire 10, thereby preventing the wheel W from being further turned. Therefore, no undue force is applied to the hub 6 when the nuts 502 are tightened.

In the illustrated embodiment, the bolts 409 are eccentrically attached to the respective shafts 407, and the lines $l_1$, $l_2$ extend at the prescribed angle to each other for enabling the teeth 411 to bite into the tire 10 when the nuts 502 are tightened. The teeth 411 may more effectively bit into the tire 10 by positioning resilient members as of rubber between the shafts 407 and the fingers 408.

Figure 21:
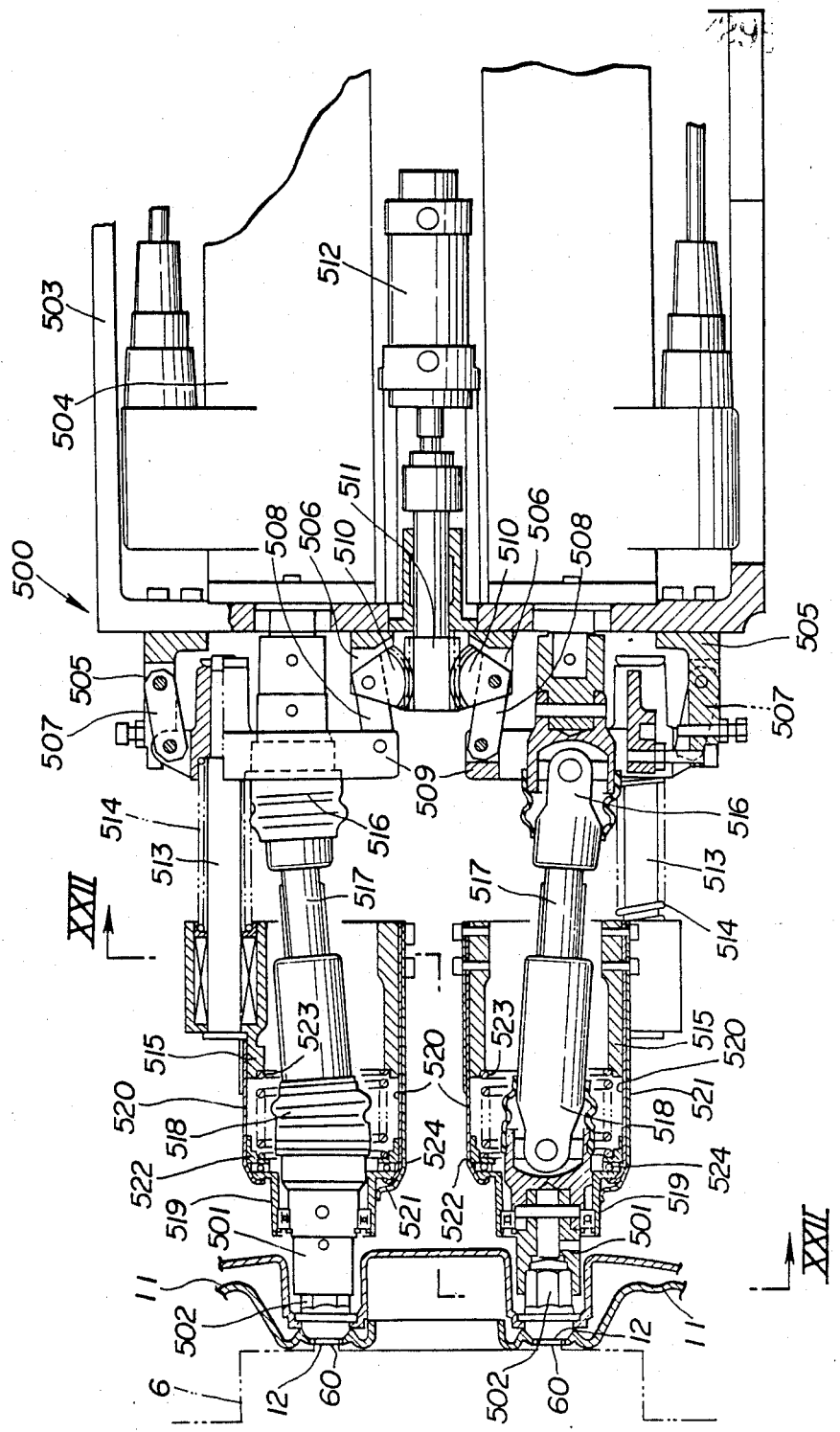
FIG. 21 is a cross-sectional view of a nut runner.
Figure 22:
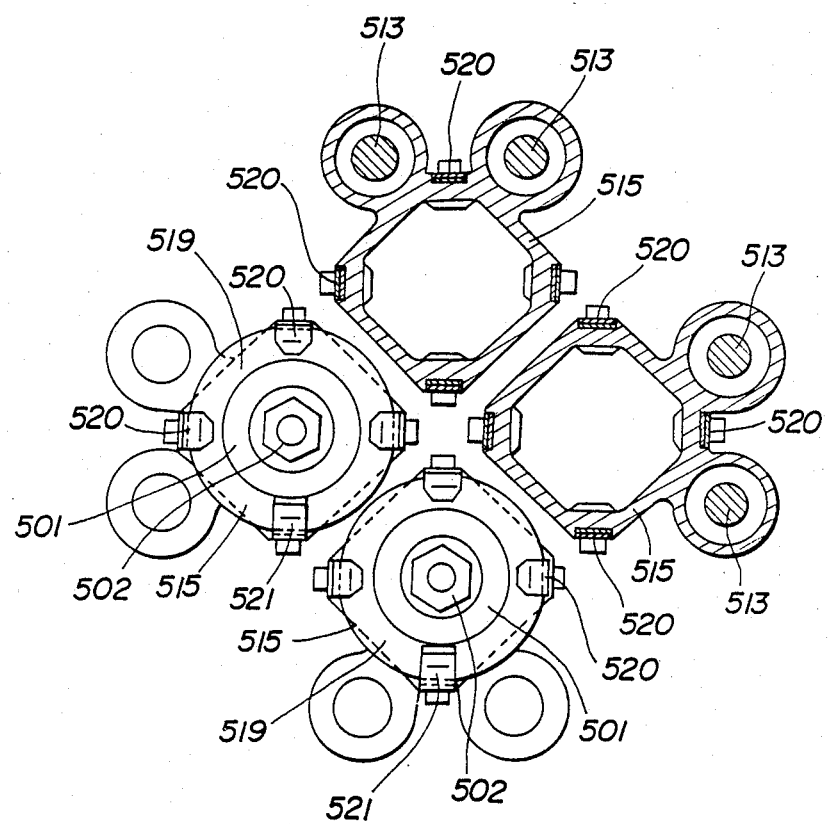
FIG. 22 is a partly cross-sectional view taken along line XXII—XXII of FIG. 21.

The nut runner 500 will be described in detail with reference to FIGS. 21 through 23. As shown in FIG. 21, the nut runner 500 has a main body or housing 503 accommodating therein four motors 504 (only two shown), four pairs of brackets 505, 506 (only two pairs shown) mounted on a front surface (on lefthand side in FIG. 21) of the housing 503, and tables 509 coupled by parallel links 507, 508 to the brackets 505, 506. To the links 508 closer to the center of the nut runner 500, there are fixed four sector-shaped pinions 510, respectively, meshing with a single rack 511 which is operated by a cylinder unit 512 positioned between the motors 504.

Guide rods 513 are mounted respectively on the tables 509. Cases 515 are slidably mounted respectively on the guide rods 513 with springs 514 disposed around the guide rods 513 between the cases 515 and tables 509.

The motors 504 have rotatable output shafts coupled respectively to drive shafts 517 through constant-velocity universal joints 516. Other constant-velocity universal joints 518 are splined to the drive shafts 517, respectively, so that the constant-velocity joints 518 are rotatable with the drive shafts 517 and axially movable with respect to the drive shafts 517. The constant-velocity joints 518 are disposed in the respective cases 515, with the sockets 501 coupled to the distal ends thereof.

Each of the sockets 501 is rotatably supported in a tubular bearing member 519 having a magnet for magnetically attracting a nut supplied from an automatic nut feeder. The bearing member 519 is supported on the case 515 by four leaf springs 520 which are located in upper, lower, and lateral positions. The leaf springs 520 have distal ends supporting the rear end of the bearing member 519 to center the bearing member 519 for thus normally urging the sockets into coaxial alignment with the cases. The lower leaf spring 520 is held in overlapping relation to another leaf spring 521, and attached therewith to the case 515. When the nut runner 500 is moved toward the hub 6, the nut 502 held in the socket 501 abuts against the tip of the hub bolt 60, and the socket 501 is moved inwardly (to the right in FIG. 21). At this time, the socket 501 is released from the support by the four leaf springs 520. The leaf spring 521 serves to hold the socket 501 from below to prevent the same from tumbling downwardly.

A single coil spring 523 is disposed around the constant-velocity joint 518 between the front end of the case 515 and a spring seat 522. A ball bearing 524 is positioned between the spring seat 522 and an inner surface of the socket 501 for allowing the socket 501 to move under a very small force substantially in the radial direction of the case 515.

For tightening nuts 502 with the nut runner 500, the nuts 502 are supplied to the nut runner 500, and then the shaft 106 is turned 90° from the position of FIGS. 2 and 3 until the unit B faces the hub 6. At this time, the unit B is controlled by the control unit (not shown) such that the unit B confronts the hub 6 at the exactly central position thereof which has been computed by the control unit based on the output signals from the rotary encoders 312, 313 of the hub bolt phasing device 300.

Then, the wheel gripping device 400 is moved toward the hub 6 to insert the hub bolts 60 into the respective hub bolt attachment holes 12 of the wheel center 11 of the wheel W, and thereafter the nut runner 500 is advanced toward the hub 6. The nuts 502 are then tightened over the respective hub bolts 70 by energizing the motors 504.

Figure 23A:
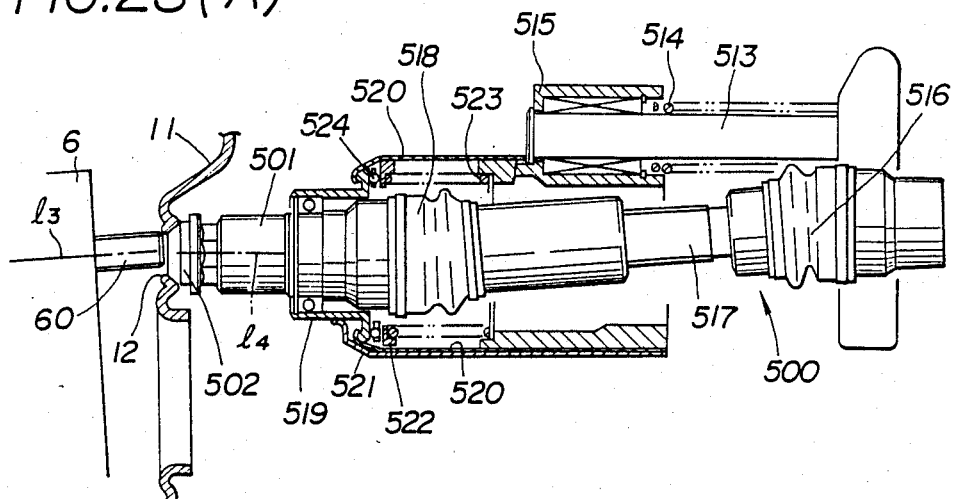
FIGS. 23(A) through 23(C) are cross-sectional views showing the manner in which a nut held in a socket of the nut runner is axially aligned with a hub bolt.

The hub bolts 60 may not necessarily extend perpendicularly to the attachment surface of the hub 6, but may be inclined at an angle ranging from 2° to 3°. For example, the axis $l_3$ of the hub bolt 60 may not be aligned with the axis $l_4$ of the nut 502, as shown in FIG. 23(A). If the nut 502 were tightened in this condition, it would not properly be threaded over the hub bolt 60 or would not be removed from the socket 501 after being tightened over the hub bolt 60.

Figure 23B:
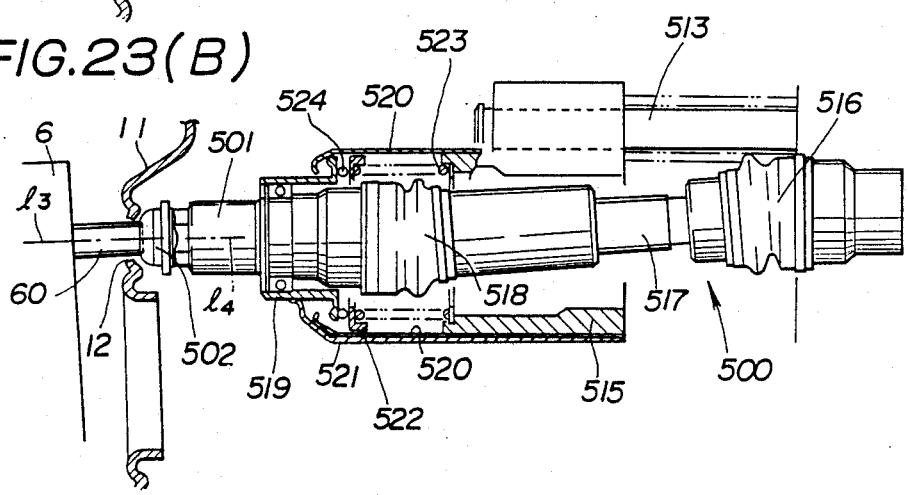

To overcome the above problem, the axis $l_3$ of the hub bolt 60 and the axis $l_4$ of the nut 502 are brought into alignment with each other as follows: The socket 501 is rotated from the position of FIG. 23(A) while the nut runner 500 is moved toward the hub 6. When the inner surface of the nut 502 hits the tip end of the hub bolt 60 and the socket 501 is moved back by reactive forces from the hub bolt 60 as shown in FIG. 23(B), the socket 501 is moved substantially radially of the case 515 since the resistance to the rolling movement of the ball bearing 524 between the spring seat 522 and the socket 501 is very small. Thus, the axes $l_3$, $l_4$ are brought into alignment with each other as illustrated in FIG. 23(B).

Figure 23C:
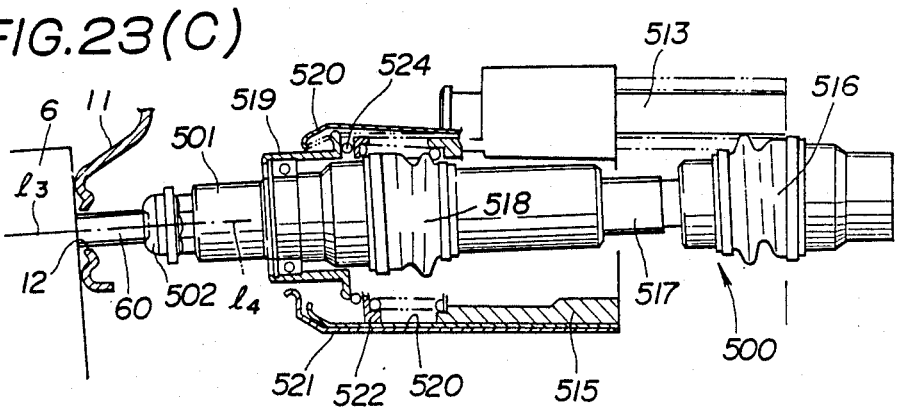

Then, as shown in FIG. 23(C), the nut runner 500 is moved toward the hub 6 to move the socket 501 relatively backwards further, where upon the socket 501 is tilted against the flexural rigidity of the spring 523 to cause the axes $l_3$, $l_4$ to be completely aligned with each other. For the axes $l_3$, $l_4$ to be completely aligned with each other, the sockets 501 must be moved in any of vertical and lateral directions from the position of FIG. 23(B), and such movement of the socket 501 is allowed by the bending of the leaf springs 520. The rotation of the motor 504 during this time is transmitted through the constant-velocity joint 516, the drive shaft 517, and the constant-velocity joint 518 to the socket 501 to tighten the nut 502 over the hub bolt 60.

Where wheels W are to be attached to an automotive body of a different type with different distances between hub bolts 60, the cylinder unit 512 in the housing 503 is operated to move the rack 511 in one direction or the other. The pinions 510 are turned to angularly move the parallel links 507, 508 to move the tables 509 toward or away from each other. Thus, the sockets 501 supported on the tables 509 by the guide rods 513 and the cases 515 are also moved toward or away from each other until they are properly aligned with the hub bolts 60.

As described above, the bearing member 519 of the nut runner 500 is floatingly supported so that when the nut 502 is pressed against the hub bolt 60, the bearing 519 can be varied in position and angle to enable the nut 502 to be aligned with the hub bolt 60 under a small force. Specifically, the bearing 519 is moved first to correct axial misalignment of the nut 502 and the hub bolt 60 and then to correct angular deviation between the nut 502 and the hub bolt 60. Therefore, the nut 502 will properly be tightened over the hub bolt 60 without biting threaded engagement, and will smoothly be removed from the socket 501 after it is tightened over the hub bolt 60.

With the present invention, since the reorienting device for reorienting the hub, the phasing device for phasing the hub bolts, and the device for detecting the position of the hub are incorporated in one robot, the apparatus is integrated and the time required to attach wheels to an automotive body is shortened. With the various devices combined in one robot, the hub reorientation, the hub bolt phasing, and the positional detection can be performed without rotating the robot, and the wheel attachment process can be effected highly efficiently.

The apparatus can be more integrated and the wheel attachment time can be reduced by incorporating the nut runner and the wheel gripping device in the robot.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A nut runner comprising a plurality of sockets for holding nuts to be tightened over wheel attachment bolts on a wheel attachment member, a plurality of motors for rotating said sockets respectively, a plurality of drive shafts coupled to said motors, respectively, and a plurality of universal joints connecting said sockets and said drive shafts while allowing said sockets to be tilted with respect to said drive shafts, said universal joints being movable axially of said drive shafts to allow said sockets to be retracted under reactive forces produced when the nuts engage said wheel attachment bolts.

2. A nut runner according to claim 1, further including a housing, and a plurality of cases supported on said housing and surrounding intermediate portions of said drive shaft, respectively, said sockets being resiliently biased to move with said universal joints in a direction away from said cases, said sockets being movably radially of said cases, respectively.

3. A nut runner according to claim 2, further including a plurality of leaf springs operatively interconnecting said sockets and said cases for normally urging said sockets into coaxial alignment with said cases.

4. A nut runner according to claim 2, further including bearing means for facilitating movements of said sockets radially of said cases.

5. A nut runner according to claim 2, further including a plurality of guide rods interconnecting said housing and cases, said cases are slidably mounted on said guide rods and biased away from said housing.

6. A nut runner according to claim 5, wherein said guide rods are pivotably connected to said housing; and said nut runner further includes means for simultaneously adjusting the positions of the guide rods relative to the housing.

* * * * *

UNITED STATES PATENT AND TRADEMARK OFFICE
CERTIFICATE OF CORRECTION

PATENT NO. : 4,909,105

DATED : March 20, 1990

INVENTOR(S) : Namiki et al.

It is certified that error appears in the above-identified patent and that said Letters Patent is hereby corrected as shown below:

```
Column 2, line 39, correct the spelling of "automatic".
Column 3, line 25, change "thr" to --the--;
         line 59, change "is" to --in--;
         line 63, correct the spelling of "intermittently".
Column 7, line 5, before "arrows" insert --respective--.
Column 10, line 9, change "fingers" to --finger--.
Column 12, line 56, correct the spelling of "device";
          line 65, after "they" insert --are--.
Column 13, line 21, before "unit" insert--cylinder--;
          line 22, after "unit B" insert --and the shaft 106 is turned 90°
          to cause the unit B--;
          line 59, change "bit" to --bite--.
Column 16, line 38 (Claim 2, line 4), change "shaft" to --shafts--.
```

Signed and Sealed this

Fifth Day of November, 1991

*Attest:*

HARRY F. MANBECK, JR.

*Attesting Officer*  *Commissioner of Patents and Trademarks*